(12) United States Patent
Lewis et al.

(10) Patent No.: US 10,449,528 B2
(45) Date of Patent: *Oct. 22, 2019

(54) HIGH CHARGE DENSITY SILICOMETALLOPHOSPHATE MOLECULAR SIEVES

(71) Applicant: UOP LLC, Des Plaines, IL (US)

(72) Inventors: Gregory J. Lewis, Santa Cruz, CA (US); Lisa Knight, Chicago, IL (US)

(*) Notice: Subject to any disclaimer, the term of this patent is extended or adjusted under 35 U.S.C. 154(b) by 149 days.

This patent is subject to a terminal disclaimer.

(21) Appl. No.: 15/446,343

(22) Filed: Mar. 1, 2017

(65) Prior Publication Data

US 2017/0252733 A1    Sep. 7, 2017

Related U.S. Application Data

(60) Provisional application No. 62/303,579, filed on Mar. 4, 2016.

(51) Int. Cl.
| | |
|---|---|
| C01B 39/54 | (2006.01) |
| B01J 29/82 | (2006.01) |
| B01J 29/85 | (2006.01) |
| B01J 37/16 | (2006.01) |
| B01J 37/30 | (2006.01) |
| C01B 39/48 | (2006.01) |
| C10G 35/06 | (2006.01) |
| C10G 47/16 | (2006.01) |
| C10G 11/05 | (2006.01) |
| C10G 50/00 | (2006.01) |
| C10G 45/64 | (2006.01) |
| C10G 45/12 | (2006.01) |
| C10G 29/20 | (2006.01) |
| C10G 3/00 | (2006.01) |

(52) U.S. Cl.
CPC ............... B01J 29/85 (2013.01); B01J 29/82 (2013.01); B01J 37/16 (2013.01); B01J 37/30 (2013.01); C01B 39/54 (2013.01); C01B 39/48 (2013.01); C01P 2002/74 (2013.01); C10G 3/49 (2013.01); C10G 11/05 (2013.01); C10G 29/205 (2013.01); C10G 35/065 (2013.01); C10G 45/12 (2013.01); C10G 45/64 (2013.01); C10G 47/16 (2013.01); C10G 50/00 (2013.01); Y02P 30/42 (2015.11)

(58) Field of Classification Search
CPC  C01B 39/54; C01B 39/48; B01J 29/85; B01J 29/82; B01J 37/16; B01J 37/30; C01P 2002/74; C10G 3/49; C10G 11/05; C10G 29/205; C10G 35/065; C10G 45/12; C10G 45/64; C10G 47/16; C10G 47/20; C10G 50/00

See application file for complete search history.

(56) References Cited

U.S. PATENT DOCUMENTS

| | | | |
|---|---|---|---|
| 3,443,892 A | 5/1969 | Wacks et al. | |
| 4,310,440 A | 1/1982 | Wilson et al. | |
| 4,440,871 A | 4/1984 | Lok et al. | |
| 4,500,651 A * | 2/1985 | Lok | B01J 20/186 502/150 |
| 4,567,029 A * | 1/1986 | Wilson | B01J 27/18 208/114 |
| 4,683,217 A * | 7/1987 | Lok | B01J 29/85 423/306 |
| 4,778,780 A | 10/1988 | Valyocsik et al. | |
| 4,853,197 A * | 8/1989 | Wilson | B01J 29/85 423/306 |
| 4,870,222 A | 9/1989 | Bakas et al. | |
| 4,973,785 A | 11/1990 | Lok et al. | |
| 5,126,308 A | 6/1992 | Barger et al. | |
| 5,157,196 A | 10/1992 | Crossland et al. | |
| 5,157,197 A | 10/1992 | Cooper et al. | |
| 5,302,362 A * | 4/1994 | Bedard | C01B 39/54 423/306 |
| 6,776,975 B2 | 8/2004 | Wilson et al. | |
| 8,696,886 B1 | 4/2014 | Lewis et al. | |
| 8,697,927 B1 | 4/2014 | Lewis et al. | |
| 8,871,177 B2 | 10/2014 | Lewis et al. | |
| 8,871,178 B2 | 10/2014 | Lewis et al. | |
| 8,911,704 B2 | 12/2014 | Lewis et al. | |

(Continued)

FOREIGN PATENT DOCUMENTS

| | | |
|---|---|---|
| RU | 2445166 C2 | 3/2012 |
| WO | 2004039725 A2 | 5/2004 |

OTHER PUBLICATIONS

Broach, "New ABC-6 net molecular sieves ZnAPO-57 and ZnAPO-59: Framework charge density-induced transition from two- to three-dimensional porosity", Microporous and Mesoporous Materials 189 (2014) 49-63.

(Continued)

Primary Examiner — David M Brunsman

(57) ABSTRACT

A new family of crystalline microporous high charge density silicometallophosphates has been synthesized. These silicometallophosphate are represented by the empirical formula of:

$$R^{p+}{}_r M_m{}^+ E_x PSi_y O_z$$

where M is an alkali metal such as potassium, R is any quaternary ammonium cation such as ethyltrimethylammonium and E is a trivalent framework element such as aluminum or gallium. This family of high charge density silicometallophosphate molecular sieves has catalytic properties for carrying out various hydrocarbon conversion processes and separation properties for separating at least one component.

17 Claims, No Drawings

(56) References Cited

U.S. PATENT DOCUMENTS

| | | | | |
|---|---|---|---|---|
| 8,916,738 | B2* | 12/2014 | Lewis | C07C 2/66 |
| | | | | 208/110 |
| 8,933,287 | B2* | 1/2015 | Lewis | C07C 2/66 |
| | | | | 208/110 |
| 8,936,776 | B2* | 1/2015 | Lewis | C01B 39/54 |
| | | | | 423/277 |
| 10,159,964 | B2* | 12/2018 | Lewis | C10G 45/04 |
| 10,159,965 | B2* | 12/2018 | Lewis | B01J 20/048 |
| 2014/0193327 | A1 | 7/2014 | Casci et al. | |
| 2017/0252732 | A1 | 9/2017 | Lewis et al. | |
| 2017/0252733 | A1 | 9/2017 | Lewis et al. | |
| 2017/0252734 | A1 | 9/2017 | Lewis et al. | |

OTHER PUBLICATIONS

Flanigen, "Phosphorus Substitution in Zeolite Frameworks", Molecular Sieve Zeolites-I, Chapter 6, pp. 76-101, Chapter DOI: 10.1021/ba-1971-0101.ch006; Advances in Chemistry, vol. 101; ISBN13: 9780841201149eISBN: 9780841222816; Publication Date (Print): Aug. 1, 1974; Copyright © 1971 American Chemical Society.

Gatter, "Stability of Framework Aluminum in the New Zeolite UZM-5", Studies in Surface Science and Catalysis, vol. 154; pp. 1324-1331; E. van Steen, L.H. Callanan and M. Claeys (Editors); Copyright 2004 Elsevier B.V.

Kuhl, "High-silica analogs of zeolite A containing intercalated phosphate", Inorg. Chem., 1971, 10 (11), pp. 2488-2495.

Wilson, "Synthesis, characterization and structure of SAPO-56, a member of the ABC double-six-ring family of materials with stacking sequence AABBCCBB", Microporous and Mesoporous Materials 28 (1999) 125-137.

Search Report dated Jun. 1, 2017 for corresponding PCT Appl. No. PCT/US2017/020328.

\* cited by examiner

HIGH CHARGE DENSITY SILICOMETALLOPHOSPHATE MOLECULAR SIEVES

CROSS-REFERENCE TO RELATED APPLICATION

This application claims priority from Provisional Application No. 62/303,579 filed Mar. 4, 2016, the contents of which are hereby incorporated by reference.

FIELD OF THE INVENTION

This invention relates to a new family of charged microporous silicometallophosphate-based molecular sieves. They are represented by the empirical formula of:

$$R^{p+}_r M^+_m E_x PSi_y O_z$$

where M is an alkali metal, R is any quaternary ammonium cation and E is a trivalent framework element such as aluminum or gallium. This family of high charge density silicometallophosphate molecular sieves has catalytic properties for carrying out various hydrocarbon conversion processes and separation properties for separating at least one component.

BACKGROUND OF THE INVENTION

Zeolites are crystalline aluminosilicate compositions which are microporous and which are formed from corner sharing $[AlO_{4/2}]^-$ and $SiO_{4/2}$ tetrahedra. Numerous zeolites, both naturally occurring and synthetically prepared are used in various industrial processes. Synthetic zeolites are prepared via hydrothermal synthesis employing suitable sources of Si, Al and structure directing agents (SDAs) such as alkali metals, alkaline earth metals, amines, or organoammonium cations. The structure directing agents reside in the pores of the zeolite and are largely responsible for the particular structure that is ultimately formed. These species balance the framework charge associated with aluminum and can also serve as space fillers. Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure. Zeolites can be used as catalysts for hydrocarbon conversion reactions, which can take place on outside surfaces of the zeolite as well as on internal surfaces within the pores of the zeolite.

In 1982, Wilson et al. developed aluminophosphate molecular sieves, the so-called AlPOs, which are microporous materials that have many of the same properties of zeolites, but are silica free, composed of $[AlO_{4/2}]^-$ and $[PO_{4/2}]^+$ tetrahedra (See U.S. Pat. No. 4,319,440). Subsequently, charge was introduced to the neutral aluminophosphate frameworks via the substitution of $SiO_{4/2}$ tetrahedra for $[PO_{4/2}]^+$ tetrahedra to produce the SAPO molecular sieves (See U.S. Pat. No. 4,440,871). Another way to introduce framework charge to neutral aluminophosphates is to substitute $[M^{2+}O_{4/2}]^{2-}$ tetrahedra for $[AlO_{4/2}]^-$ tetrahedra, which yield the MeAPO molecular sieves (see U.S. Pat. No. 4,567,029). It is furthermore possible to introduce framework charge on AlPO-based molecular sieves via the introduction both of $SiO_{4/2}$ and $[M^{2+}O_{4/2}]^{2-}$ tetrahedra to the framework, giving MeAPSO molecular sieves (See U.S. Pat. No. 4,973,785). Structure directing agents employed in these works were amines and organoammonium cations.

Before the SAPO materials of U.S. Pat. No. 4,440,871 were known, there were attempts to make "phosphate zeolites," i.e., substitution of phosphorus for silicon in an aluminosilicate. Such a substitution in an aluminosilicate zeolite, $[PO_{4/2}]^+$ for $[SiO_{4/2}]$, represents a reduction of the negative charge on an aluminosilicate framework. The initial work by Flanigen and Grose co-precipitated the components of silicoaluminophosphate gels, isolated the resulting solid, suspended the resulting solids in alkali hydroxide solutions and treated them under hydrothermal conditions, yielding a series of phosphate zeolites, including those of LTL, CHA, LTA, and GIS topologies (See E. M. Flanigen and R. W. Grose, Advances in Chemistry Series No. 101, ACS, Washington D.C., 1971). The low phosphate preparations, P/Al≤1.1, resulted in alkali silicoaluminophosphate species that were not as thermally stable as their aluminosilicate analogs, often less than 350-400° C., and reduced adsorption capacity in some cases suggest the possibility of some occluded phosphate in pores and cages. Similarly, Wacks et al. disclose a process for preparing silicoaluminophosphate zeolites that entails digesting hydrated aluminophosphate solids in the presence of sodium silicate solutions to make the desired silicoaluminophosphate materials, in which the claimed range of phosphate incorporation was given by $P_2O_5/Al_2O_3=0$-0.2, suggesting that the Al/P≥5 in these materials (See K. Wacks et. al., U.S. Pat. No. 3,443,892). While eight examples of this zeolite synthesis process are disclosed in U.S. Pat. No. 3,443,892, there is no data offered that shows that any P was actually incorporated into the zeolite product, which is a possibility given the claimed range. Many attempts to make silicoaluminophosphate zeolites resembled reactions that would be used to make aluminosilicate zeolites, but carried out in the presence of phosphate, yielding little phosphate incorporation. Kuhl conducted syntheses of silicoaluminophosphate compositions, employing high levels of both phosphate and hydroxide, utilizing a combination of tetramethylammonium and sodium hydroxides for the latter, to make the LTA-related species ZK-21 and ZK-22 (See G. H. Kuhl, Inorganic Chemistry, 10, 1971, p. 2488). These species exhibit low phosphate incorporation, Al/P>8.9, and it was concluded that the phosphate was occluded in zeolitic cages rather than incorporated into the framework. Casci et al. disclose low phosphate chabazite materials in which the framework phosphorus is claimed to be between 0.05-5 mole %, i.e., P/(Al+Si+P)=0.0005-0.05 (See US 2014/0193327). The amount of phosphate employed in the reaction mixtures of the examples are low (Al/P>5.5) and no data is offered in the examples to show what the P incorporation actually is. An outlier disclosed in the SAPO patent (U.S. Pat. No. 4,440,871) uses some sodium aluminate, tetramethylammonium hydroxide and low phosphate (P/Al=0.4) to prepare SAPO-42 (Example 48), which has the LTA topology and a composition similar to that of ZK-21 and ZK-22 mentioned above as Al/P>10. The SAPO-42 product is described in the application by an essential formulation that does not include alkali, since U.S. Pat. No. 4,440,871 only covers compositions of the formulation $mR:(Si_xAl_yP_z)O_2$. This patent application also discloses the synthesis of SAPO-20 from the same reaction mixture treated at higher temperature (Example 28). The SAPO-20 product, which has the SOD topology, is not porous, but has a slightly enhanced P content as Al/P=3.17.

For many years now, a large gap has been present in the known compositions of microporous silicoaluminophosphates, between the SAPOs disclosed in U.S. Pat. No. 4,440,817 and what are essentially the "phosphate zeolites" reviewed in the previous paragraph. In particular, the materials of intermediate silicon and phosphorus levels are missing, materials of intermediate charge density, of higher charge density than the SAPOs originating from low level substitution of Si into neutral AlPO frameworks. More recently, Lewis et al. addressed this gap by developing solution chemistry that led to higher charge density SAPO, MeAPO, and MeAPSO materials, enabling greater substitution of $SiO_{4/2}$ and $[M^{2+}O_{4/2}]^{2-}$ into the framework for $[PO_{4/2}]^+$ and $[AlO_{4/2}]^-$, respectively, compared to U.S. Pat. No. 4,440,817, using the ethyltrimethylammonium (ETMA$^+$) and diethyldimethylammonium (DEDMA$^+$) SDAs. These materials include ZnAPO-57 (U.S. Pat. No. 8,871,178), ZnAPO-59 (U.S. Pat. No. 8,871,177), ZnAPO-67 (U.S. Pat. No. 8,697,927), and MeAPSO-64 (U.S. Pat. No. 8,696,886). These materials exhibited framework charge densities up to −0.15/T-atom. The relationship between the increasing product charge densities and reaction parameters, namely the ETMAOH(DEDMAOH)/$H_3PO_4$ ratios, were outlined in the literature (See Microporous and Mesoporous Materials, 189, 2014, 49-63).

Applicants have now taken another step to further address this charge density gap between low charge density SAPOs and "phosphate zeolites." Applicants have now synthesized a new family of charged silicometallophosphate framework materials which contain both alkali metal and organoammonium cations in the pores. These materials have higher charge densities than the SAPOs of U.S. Pat. No. 4,440,871, which is enabled by the incorporation of alkali cations in addition to organoammonium cations into the synthesis and ultimately into the pores of the products. A synthesis process to make these intermediate charge density compositions includes the use of excess phosphate (8>P/Al>2), a judicious use of hydroxide, preferably 1.25≤OH$^-$/$H_3PO_4$≤2.5, combined with an appropriate ratio of alkali and quaternary ammonium cations, all of which allow the isolation of the desired midrange P and Si compositions and avoid the "phosphate zeolites," discussed above. Unlike the art disclosed above, the reaction mixtures from which the high charge density SAPOs disclosed here are prepared are often clear solutions. The high charge density SAPO materials of this invention are crystalline microporous compositions and they are thermally stable to at least 450° C. and often contain "Si islands."

SUMMARY OF THE INVENTION

As stated, the present invention relates to a new family of silicometallophosphate molecular sieves. Accordingly, one embodiment of the invention is a crystalline microporous material having a three-dimensional framework of $[EO_{4/2}]^-$ and $[PO_{4/2}]^+$ and $SiO_{4/2}$ tetrahedral units and an empirical composition in the as synthesized form and anhydrous basis expressed by an empirical formula of:

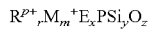

where R is at least one of any quaternary ammonium cation, diquaternary ammonium cation triquaternary cation, quatroquaternary cation and mixtures thereof, "r" is the mole ratio of R to P and has a value of about 0.2 to about 3.0, "p" is the weighted average valence of R and varies from 1 to 4, M is an alkali metal such as Li$^+$, Na$^+$, K$^+$, Rb$^+$ and Cs$^+$ and mixtures thereof, "m" is the mole ratio of M to P and varies from 0.2 to 3.0, E is a trivalent element selected from the group consisting of aluminum and gallium and mixtures thereof, "x" is the mole ratio of E to P and varies from 1.25 to about 4.0, "y" is the mole ratio of Si to P and varies from 0.25 to about 4.5, "y"≥"x"−1, and "z" is the mole ratio of O to P and has a value determined by the equation:

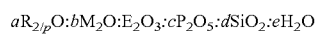

Another embodiment of the invention is a process for preparing the crystalline silicometallophosphate molecular sieve described above. The process comprises forming a reaction mixture containing reactive sources of R, E, P, M and Si, and heating the reaction mixture at a temperature of about 60° C. to about 200° C. for a time sufficient to form the molecular sieve, the reaction mixture having a composition expressed in terms of mole ratios of the oxides of:

$$aR_{2/p}O:bM_2O:E_2O_3:cP_2O_5:dSiO_2:eH_2O$$

where "a" has a value of about 2.5 to about 20, "b" has a value of about 0.125 to about 1.5, "c" has a value of about 2 to about 8, "d" has a value of about 0.25 to about 8, and "e" has a value from 50 to 1000.

Yet another embodiment of the invention is a hydrocarbon conversion process using the above-described molecular sieve as a catalyst. The process comprises contacting at least one hydrocarbon with the molecular sieve at conversion conditions to generate at least one converted hydrocarbon.

Still another embodiment of the invention is a separation process using the crystalline high charge density (HCD) SAPO material. The process may involve separating mixtures of molecular species or removing contaminants by contacting a fluid with the HCD SAPO molecular sieve. Separation of molecular species can be based either on the molecular size (kinetic diameter) or on the degree of polarity of the molecular species. Removing contaminants may be by ion exchange with the molecular sieve.

DETAILED DESCRIPTION OF THE INVENTION

Applicants have prepared a new family of microporous silicometallophosphate compositions that exhibit high framework (FW) charge densities that require the use of alkali cations in addition to organoammonium ions to balance the FW charge. Traditional SAPOs, such as the family outlined in U.S. Pat. No. 4,440,871 chiefly use organic-based species, such as amines and quaternary ammonium species, for FW charge balance. Unlike the "phosphate zeolites" outlined above, these materials also contain significant amounts of phosphate. The instant microporous crystalline materials have an empirical composition in the as-synthesized form and on an anhydrous basis expressed by the empirical formula:

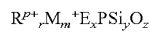

where M is at least one alkali cation and is selected from the group of alkali metals. Specific examples of the M cations include but are not limited to lithium, sodium, potassium, rubidium, cesium and mixtures thereof. R is at least one of any quaternary ammonium cation, diquaternary ammonium cation triquaternary cation, quatroquaternary cation and mixtures thereof and "r" is the mole ratio of R to P and varies from about 0.2 to about 3.0, while "p" is the weighted average valence of R and varies from about 1 to 4. The value of "m" is the mole ratio of M to P and varies from 0.2 to about 3.0, "x" is mole ratio of E to P and varies from 1.25 to about 4.0. The ratio of silicon to P is represented by "y" which varies from about 0.25 to about 4.5 and "y"≥"x"−1. E is a trivalent element which is tetrahedrally coordinated, is present in the framework and is selected from the group consisting of aluminum and gallium. Lastly, "z" is the mole ratio of O to P and is given by the equation:

$$z=(m+r \cdot p+3 \cdot x+5+4 \cdot y)/2.$$

When only one type of R organoammonium cation is present, then the weighted average valence is just the valence of that cation, e.g., +1 or +2. When more than one R cation is present, the total amount of R is given by the equation:

$$R_r^{p+}=R_{r1}^{(p1)+}+R_{r2}^{(p2)+}+R_{r3}^{(p3)+}+\ldots$$

the weighted average valence "p" is given by:

$$p = \frac{r1 \cdot p1 + r2 \cdot p2 + r3 \cdot p3 + \cdots}{r1 + r2 + r3 + \cdots}$$

The HCD silicometallophosphates of this invention are crystalline microporous materials with well-defined pore channels. By "microporous" it is meant that the crystalline silicometallophosphate contains at least one pore system with at least an 8-member ring opening, where an 8-member ring refers to a pore in which 8 T-atoms line the pore circumference; this nomenclature is well-known in the art. That is, the silicometallophosphates of this invention will exhibit at least one pore with, for example, 8-ring, 10-ring, 12-ring or an even higher number of T-atoms lining the circumference of the pore walls. On the other hand, materials that contain 6-rings are not considered to be porous and are not part of this invention, for example, materials of the SOD, LOS, or RUT topologies. When the topology of the silicometallophosphate is known, as identified by powder x-ray diffraction, the determination of microporosity can be made by consulting the Database of Zeolite structures at (http://izasc.biw.kuleuven.be/fmi/xsl/IZA-SC/ft.xsl). However, when the topology of the silicometallophosphates of this invention is not known, the determination of microporosity can be made by ion-exchange of the calcined silicometallophosphate or by the adsorption of at least a small molecule, such as water. These practices are well known in the art.

The HCD silicometallophosphates of this invention are characterized by a high charge density compared to that known for most SAPO materials and often exhibit significant formation of "Si islands," i.e., Si—O—Si bonding. The FW charge on the ideal silicometallophosphates of this invention in terms of the formula given above is "x"−1 or Al−P, when E=Al. The charge on these materials is sufficient that highly charged alkali cations are required in addition to organoammonium cations to balance the FW charge. Often in SAPO materials, elemental content is expressed in terms of a ratio to the P content, i.e., P=1, the compositional relationship between Al, Si and P is given by "x"−1="y" or Al−P=Si or equivalently, Al=P+Si. In this case, compared to a neutral AlPO-based material, Si only substitutes for P, adding FW charge in the process. All FW phosphorous must be isolated because it can only be bonded to Al in the framework via P—O—Al bonding, and therefore, the Si substituting for P is also isolated. An example of this is seen for the case of the moderately high charge density SAPO-59 (see U.S. Pat. No. 8,871,177). "Si islands" are known in the art even for lower charge density materials, for example, for SAPO-56 (See Microporous and Mesoporous Materials, 28, (1999), 125-137). When a "Si island" forms, Si not only substitutes for P, but also for Al, as a portion of the FW Al—O—P bonding is substituted by Si—O—Si bonding. In the present case of the silicometallophosphates, both modes of Si substitution are possible, both direct Si substitution for P and more extensive Si substitution leading to "Si islands" and is represented by the compositional specification that "y"≥"x"−1, i.e., Si≥Al-P. For the case in which Si>Al-P, there is more Si than is required to accommodate the FW charge due to strict Si substitution for P, meaning that some of the Si is no longer isolated and is thus engaged in the more extensive substitution for Al and P, leading to the "Si island." As illustrated in the examples, the formation of "Si islands" can be extensive; often "y">"x," or Si>Al, a much higher degree of Si incorporation than strict replacement of P for FW charge considerations, i.e., "y"="x"−1.

The instant microporous crystalline HCD silicometallophosphates of this invention are prepared by a hydrothermal crystallization of a reaction mixture prepared by combining reactive sources of R, E, phosphorous, M and silicon. A preferred form of the HCD silicometallophosphate materials is when E is Al. The sources of aluminum include but are not limited to aluminum alkoxides, precipitated aluminas, aluminum metal, aluminum hydroxide, aluminum salts, alkali aluminates and alumina sols. Specific examples of aluminum alkoxides include, but are not limited to aluminum ortho sec-butoxide and aluminum ortho isopropoxide. Sources of phosphorus include, but are not limited to, orthophosphoric acid, phosphorus pentoxide, and ammonium dihydrogen phosphate. Sources of silica include but are not limited to tetraethylorthosilicate, fumed silica, alkali silicates, colloidal silica, and precipitated silica. Sources of the other E elements include but are not limited to precipitated gallium hydroxide, gallium chloride, gallium sulfate and gallium nitrate. Sources of the M metals include the halide salts, nitrate salts, hydroxide salts, acetate salts, and sulfate salts of the respective alkali metals. R is at least one of any organoammonium cation selected from the groups consisting of quaternary ammonium, diquaternary ammonium, triquaternary ammonium, quatroquaternary ammonium cations, a few examples of which, but not limited to are ethyltrimethylammonium (ETMA$^+$), hexamethonium (HM$^{2+}$), choline, diethydimethylammonium (DEDMA$^+$), trimethylpropylammonium, tetramethylammonium (TMA$^+$), tetraethylammonium (TEA), tetrapropylammonium (TPA$^+$) and mixtures thereof, and the sources include the hydroxide, chloride, bromide, iodide, acetate and fluoride compounds. Specific examples include without limitation ethyltrimethylammonium hydroxide, ethyltrimethylammonium chloride, hexamethonium dihydroxide, hexamethonium dichloride, choline hydroxide, choline chloride, diethyldimethylammonium chloride, diethyldimethylammonium hydroxide, propyltrimethylammonium chloride, tetramethylammonium chloride and tetraethylammonium hydroxide.

The reaction mixture containing reactive sources of the desired components can be described in terms of molar ratios of the oxides by the formula:

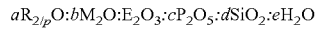

$$aR_{2/p}O:bM_2O:E_2O_3:cP_2O_5:dSiO_2:eH_2O$$

where "a" varies from about 2.5 to about 20, "b" varies from about 0.125 to about 1.5, "c" varies from about 2 to about 8, "d" varies from about 0.25 to about 8, and "e' varies from 50 to 1000. Additionally, it is often preferred that 1.25≤a/c≤2.5. If alkoxides are used, it is preferred to include a distillation or evaporative step to remove the alcohol hydrolysis products. It is also preferred that the resulting reaction mixture is a clear solution before digestion. The reaction mixture is now reacted at a temperature of about 80° C. to about 200° C. and preferably from about 100° C. to about 175° C. for a period of about 1 day to about 4 weeks and preferably for a time of about 2 days to about 21 days in a sealed reaction vessel at autogenous pressure. After crystallization is complete, the solid product is isolated from the heterogeneous mixture by means such as filtration or centrifugation, and then washed with deionized water and dried in air at ambient temperature up to about 100° C. Seeds of the crystalline silicometallophosphate can optionally be added to the reaction mixture in order to accelerate the formation of the desired microporous composition.

The crystalline microporous silicometallophosphates, which are obtained from the above-described process, are characterized by a specific x-ray diffraction pattern, as illustrated in the examples.

In one embodiment of the invention, the silicometallophosphate is thermally stable up to a temperature of at least 400° C., in another embodiment the silicometallophosphate is thermally stable up to a temperature of at least 500° C. and in still another embodiment the silicometallophosphate is thermally stable up to a temperature of at least 575° C.

The silicometallophosphate may be modified in many ways to tailor it for use in a particular application. Modifications include calcination, ammonia calcinations, ion-exchange, steaming, various acid extractions, ammonium hexafluorosilicate treatment, or any combination thereof, as outlined for the case of UZM-4 in U.S. Pat. No. 6,776,975 B1 which is incorporated by reference in its entirety. In addition, properties that may be modified include porosity, adsorption, framework composition, acidity, thermal stability, etc.

As synthesized, the silicometallophosphate material will contain some of the exchangeable or charge balancing cations in its pores. These exchangeable cations can be exchanged for other cations, or in the case of organic cations, they can be removed by heating under controlled conditions. A preferred method of removing organic cations from the pores is ammonia calcination. Calcination in air converts the organic cations in the pores to protons, which can lead to the loss of some metal, for example Al, from the framework upon exposure to ambient atmospheric water vapor. When the calcination is carried out in an ammonia atmosphere, the organic cation in the pore is replaced by $NH_4^+$ cation and the framework remains intact (See Studies in Surface Science, (2004) vol. 154, p. 1324-1331). Typical conditions for ammonia calcinations include the use of gaseous anhydrous ammonia flowing at a rate of 1.1 l/min while ramping the sample temperature at 5° C./min to 500° C. and holding at that temperature for a time ranging from 5 minutes to an hour. Once in this form, the ammonia calcined material may be ion-exchanged with $H^+$, $NH_4^+$, alkali metals, alkaline earth metals, transition metals, rare earth metals, or any mixture thereof, to achieve a wide variety of compositions with the silicometallophosphate framework in superior condition.

When the silicometallophosphate is calcined in air, there can be a loss of metal from the framework, such as Al, which can alter the x-ray diffraction pattern from that observed for the as-synthesized form (See Studies in Surface Science, (2004) vol. 154, p. 1324-1331). However, it has been determined that silicometallophosphates of this invention are stable to removal of organic cations via calcination, remaining crystalline after calcination, as demonstrated in the examples. Typical conditions for the calcination of the silicometallophosphate samples include ramping the temperature from room temperature to a calcination temperature of 400-600° C., preferably a calcination temperature of 450-550° C. at a ramp rate of 1 to 5° C./min, preferably a ramp rate of 2 to 4° C./min, the temperature ramp conducted in an atmosphere consisting either of flowing nitrogen or flowing clean dry air, preferably an atmosphere of flowing nitrogen. Once at the desired calcination temperature, if the calcination atmosphere employed during the temperature ramp is flowing clean dry air, it may remain flowing clean dry air. If the calcination atmosphere during the ramp was flowing nitrogen, it may remain flowing nitrogen at the calcination temperature or it may be immediately converted to clean dry air; preferably at the calcination temperature the calcination atmosphere will remain flowing nitrogen for a period of 1-10 hr and preferably for a period of 2-4 hours before converting the calcination atmosphere to flowing clean dry air. The final step of the calcination is a dwell at the calcination temperature in clean dry air. Whether the calcination atmosphere during the initial temperature ramp was flowing nitrogen or flowing clean dry air, once at the calcination temperature and once the calcination atmosphere is clean dry air, the silicometallophosphate sample will spend a period of 1-24 hr and preferably a period of 2-6 hr under these conditions to complete the calcination process. The calcined silicometallophosphate material is characterized in that it has roughly the x-ray diffraction pattern observed for the as-synthesized silicometallophosphate, but may exhibit some slight changes in some of the d-spacings and intensities, as illustrated in the examples.

The crystalline microporous silicometallophosphates of this invention can be used for separating mixtures of molecular species, removing contaminants through ion exchange and catalyzing various hydrocarbon conversion processes. Separation of molecular species can be based either on the molecular size (kinetic diameter) or on the degree of polarity of the molecular species. In this regard, the microporous silicometallophosphate to be considered microporous, must have at least one pore system containing at least an 8 member-ring or larger ring pore.

The microporous silicometallophosphate compositions of this invention can also be used as a catalyst or catalyst support in various hydrocarbon conversion processes. Hydrocarbon conversion processes are well known in the art and include cracking, hydrocracking, alkylation of both aromatics and isoparaffin, isomerization, polymerization, reforming, hydrogenation, dehydrogenation, transalkylation, dealkylation, hydration, dehydration, hydrotreating, hydrodenitrogenation, hydrodesulfurization, methanol to olefins, methanation and syngas shift process. Specific reaction conditions and the types of feeds which can be used in these processes are set forth in U.S. Pat. Nos. 4,310,440, 4,440,871 and 5,126,308, which are incorporated by reference. Preferred hydrocarbon conversion processes are those in which hydrogen is a component such as hydrotreating or hydrofining, hydrogenation, hydrocracking, hydrodenitrogenation, hydrodesulfurization, etc.

Hydrocracking conditions typically include a temperature in the range of 400° to 1200° F. (204-649° C.), preferably between 600° and 950° F. (316-510° C.). Reaction pressures are in the range of atmospheric to about 3,500 psig (24,132 kPa g), preferably between 200 and 3000 psig (1379-20,685 kPa g). Contact times usually correspond to liquid hourly space velocities (LHSV) in the range of about 0.1 $hr^{-1}$ to 15 $hr^{-1}$, preferably between about 0.2 and 3 $hr^{-1}$. Hydrogen circulation rates are in the range of 1,000 to 50,000 standard cubic feet (scf) per barrel of charge (178-8,888 std. $m^3/m^3$), preferably between 2,000 and 30,000 scf per barrel of charge (355-5,333 std. $m^3/m^3$). Suitable hydrotreating conditions are generally within the broad ranges of hydrocracking conditions set out above.

The reaction zone effluent is normally removed from the catalyst bed, subjected to partial condensation and vapor-liquid separation and then fractionated to recover the various components thereof. The hydrogen, and if desired some or all of the unconverted heavier materials, are recycled to the reactor. Alternatively, a two-stage flow may be employed with the unconverted material being passed into a second reactor. Catalysts of the subject invention may be used in just one stage of such a process or may be used in both reactor stages.

Catalytic cracking processes are preferably carried out with the microporous silicometallophosphate composition using feedstocks such as gas oils, heavy naphthas, deasphalted crude oil residua, etc. with gasoline being the principal desired product. Temperature conditions of 850° to 1100° F. (455° C. to 593° C.), LHSV values of 0.5 $hr^{-1}$ to 10 $hr^{-1}$ and pressure conditions of from about 0 to 50 psig (0-345 kPa) are suitable.

Alkylation of aromatics usually involves reacting an aromatic ($C_2$ to $C_{12}$), especially benzene, with a monoolefin to produce a linear alkyl substituted aromatic. The process is carried out at an aromatic:olefin (e.g., benzene:olefin) ratio of between 5:1 and 30:1, a LHSV of about 0.3 to about 6 $hr^{-1}$, a temperature of about 100° to about 250° C. and pressures of about 200 to about 1000 psig (1,379-6,895 kPa). Further details on apparatus may be found in U.S. Pat. No. 4,870,222 which is incorporated by reference.

Alkylation of isoparaffins with olefins to produce alkylates suitable as motor fuel components is carried out at temperatures of −30° to 40° C., pressures from about atmospheric to about 6,894 kPa (1,000 psig) and a weight hourly space velocity (WHSV) of 0.1 $hr^{-1}$ to about 120 $hr^{-1}$. Details on paraffin alkylation may be found in U.S. Pat. Nos. 5,157,196 and 5,157,197, which are incorporated by reference.

The conversion of methanol to olefins is effected by contacting the methanol with the microporous silicometallophosphate catalyst at conversion conditions, thereby forming the desired olefins. The methanol can be in the liquid or vapor phase with the vapor phase being preferred. Contacting the methanol with the microporous silicometallophosphate catalyst can be done in a continuous mode or a batch mode with a continuous mode being preferred. The amount of time that the methanol is in contact with the microporous silicometallophosphate catalyst must be sufficient to convert the methanol to the desired light olefin products. When the process is carried out in a batch process, the contact time varies from about 0.001 hrs to about 1 hr and preferably from about 0.01 hr to about 1.0 hr. The longer contact times are used at lower temperatures while shorter times are used at higher temperatures. Further, when the process is carried out in a continuous mode, the Weight Hourly Space Velocity (WHSV) based on methanol can vary from about 1 $hr^{-1}$ to about 1000 $hr^{-1}$ and preferably from about 1 $hr^{-1}$ to about 100 $hr^{-1}$.

Generally, the process must be carried out at elevated temperatures in order to form light olefins at a fast enough rate. Thus, the process should be carried out at a temperature of about 300° C. to about 600° C., preferably from about 400° C. to about 550° C. and most preferably from about 450° C. to about 525° C. The process may be carried out over a wide range of pressure including autogenous pressure. Thus, the pressure can vary from about 0 kPa (0 psig) to about 1724 kPa (250 psig) and preferably from about 34 kPa (5 psig) to about 345 kPa (50 psig).

Optionally, the methanol feedstock may be diluted with an inert diluent in order to more efficiently convert the methanol to olefins. Examples of the diluents which may be used are helium, argon, nitrogen, carbon monoxide, carbon dioxide, hydrogen, steam, paraffinic hydrocarbons, e. g., methane, aromatic hydrocarbons, e. g., benzene, toluene and mixtures thereof. The amount of diluent used can vary considerably and is usually from about 5 to about 90 mole percent of the feedstock and preferably from about 25 to about 75 mole percent.

The actual configuration of the reaction zone may be any well known catalyst reaction apparatus known in the art. Thus, a single reaction zone or a number of zones arranged in series or parallel may be used. In such reaction zones the methanol feedstock is flowed through a bed containing the microporous silicometallophosphate catalyst. When multiple reaction zones are used, one or more microporous silicometallophosphate catalysts may be used in series to produce the desired product mixture. Instead of a fixed bed, a dynamic bed system, e. g., fluidized or moving, may be used. Such a dynamic system would facilitate any regeneration of the microporous silicometallophosphate catalyst that may be required. If regeneration is required, the microporous silicometallophosphate catalyst can be continuously introduced as a moving bed to a regeneration zone where it can be regenerated by means such as oxidation in an oxygen containing atmosphere to remove carbonaceous materials.

The following examples are presented in illustration of this invention and are not intended as undue limitations on the generally broad scope of the invention as set out in the appended claims. The products will be designated with a name like "SAPO-69" that contains the suffix "-69" to indicate the "-69" structure which has a defined x-ray diffraction pattern and framework topology that will be indicated (using a 3-letter structure codes in standard use with the International Zeolite Structure Commission, see http://www.iza-structure.org/databases/) when possible and the prefix that reflects the compositional nature of the product, namely "SAPO" for a silicometallophosphate, although it is understood that Al may be replaced in part or fully by Ga in any of these examples.

The structures of the microporous silicometallophosphate compositions of this invention were determined by x-ray analysis. The x-ray patterns presented in the following examples were obtained using standard x-ray powder diffraction techniques. The radiation source was a high-intensity, x-ray tube operated at 45 kV and 35 mA. The diffraction pattern from the copper K-alpha radiation was obtained by appropriate computer based techniques. Flat compressed powder samples were continuously scanned at 2° to 56° (2θ). Interplanar spacings (d) in Angstrom units were obtained from the position of the diffraction peaks expressed as θ where θ is the Bragg angle as observed from digitized data. Intensities were determined from the integrated area of diffraction peaks after subtracting background, "$I_0$," being the intensity of the strongest line or peak, and "I" being the intensity of each of the other peaks.

As will be understood by those skilled in the art the determination of the parameter 2θ is subject to both human and mechanical error, which in combination can impose an uncertainty of about ±0.4° on each reported value of 2θ. This uncertainty is, of course, also manifested in the reported values of the d-spacings, which are calculated from the 2θ values. This imprecision is general throughout the art and is not sufficient to preclude the differentiation of the present crystalline materials from each other and from the compositions of the prior art. In some of the x-ray patterns reported, the relative intensities of the d-spacings are indicated by the notations vs, s, m, and w which represent very strong, strong, medium, and weak, respectively. In terms of 100× $I/I_o$, the above designations are defined as:

w=0-15; m=15-60; s=60-80 and vs=80-100

In certain instances the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present.

In order to more fully illustrate the invention, the following examples are set forth. It is to be understood that the examples are only by way of illustration and are not intended as an undue limitation on the broad scope of the invention as set forth in the appended claims.

Example 1: SAPO-69 (OFF Topology)

SAPO-69 is the first phosphate-based molecular sieve prepared that has the OFF topology. A Teflon beaker was charged with 146.55 g ETMAOH (20.47 wt. %) and equipped with a high speed stirrer. Added 12.13 g TEOS (98%) and allowed to stir 10 minutes. Then 5.79 g pre-ground aluminum isopropoxide (AIP, 13.2 wt. % Al) was added and dissolved with stirring. The reaction mixture was transferred to a Teflon bottle, sealed and placed in an oven at 95° C. to hydrolyze TEOS. After 1.5 hr, the clear solution was transferred back to the Teflon beaker under the stirrer, where it was allowed to cool with stirring. Then 19.57 g $H_3PO_4$ (85.7%) was added dropwise with continued stirring. The resulting clear solution was additionally diluted with 45.0 g de-ionized water. Separately, 1.41 g KOAc (99.4%) was dissolved in 15.2 g de-ionized water and added fast dropwise, resulting in a clear solution. The resulting clear solution was distributed among 7 Teflon-lined autoclaves and digested at temperatures of 95° C. for 183 hr, and 125, 150 and 175° C. for 48 and 183 hours at autogenous pressures. The products were isolated by centrifugation, washed with de-ionized water and dried at room temperature. The product isolated from the 175° C. synthesis after 183 hr was identified as SAPO-69 via powder x-ray diffraction. Representative diffraction lines for the 175° C., 183 hr product are shown in Table 1. Elemental analysis of this product yielded the empirical composition $ETMA_{0.61}K_{0.44}Al_{2.02}PSi_{2.49}O_{-11}$.

TABLE 1

| 2-Θ | d (Å) | $I/I_0$ (%) |
|---|---|---|
| 7.72 | 11.44 | m |
| 11.70 | 7.56 | w |
| 13.38 | 6.61 | m |
| 14.00 | 6.32 | w |
| 15.46 | 5.73 | m |
| 17.80 | 4.98 | w |
| 19.42 | 4.57 | m |
| 20.48 | 4.33 | m |
| 23.26 | 3.82 | m |
| 23.64 | 3.76 | s |
| 24.78 | 3.60 | m |
| 26.90 | 3.31 | m |
| 27.08 | 3.29 | w |
| 28.20 | 3.16 | m |
| 30.46 | 2.93 | w |
| 31.18 | 2.87 | vs |
| 31.32 | 2.85 | s |
| 33.38 | 2.68 | w |
| 35.51 | 2.53 | w |
| 35.84 | 2.50 | m |
| 36.10 | 2.49 | m |
| 40.85 | 2.21 | w |
| 42.62 | 2.12 | w |
| 42.84 | 2.11 | w |
| 43.38 | 2.08 | w |
| 45.56 | 1.90 | w |
| 46.18 | 1.97 | w |
| 47.94 | 1.90 | w |
| 49.56 | 1.84 | w |
| 51.30 | 1.78 | w |
| 55.42 | 1.66 | w |

Example 2: SAPO-69 (OFF Topology)

A Teflon beaker was charged with 146.55 g ETMAOH (20.47 wt. %) and equipped with a high speed stirrer. Added 10.11 g TEOS (98%) and allowed to stir 10 minutes. Then 4.82 g pre-ground aluminum isopropoxide (AIP, 13.2 wt. % Al) was added and dissolved with stirring. The reaction mixture was transferred to a Teflon bottle, sealed and placed in an oven at 95° C. to hydrolyze TEOS. After 1.5 hr, the clear solution was transferred back to the Teflon beaker under the stirrer, where it was allowed to cool with stirring while some of the EtOH and iPrOH evaporated. Then 16.31 g $H_3PO_4$ (85.7%) was added dropwise with continued stirring. The resulting clear solution was additionally diluted with 15.0 g de-ionized water. Separately, 1.17 g KOAc (99.4%) was dissolved in 15.0 g de-ionized water and added fast dropwise, resulting in a clear solution. The resulting clear solution was distributed among 7 Teflon-lined autoclaves and digested at temperatures of 95° C. for 182 hr, and 125, 150 and 175° C. for 48 and 182 hours at autogenous pressures. The products were isolated by centrifugation, washed with de-ionized water and dried at room temperature. The product isolated from the 175° C. synthesis after 182 hr was identified as SAPO-69 via powder x-ray diffraction, although a small amount of amorphous material was detected in the background. Representative diffraction lines for the 175° C., 183 hr product are shown in Table 2.

TABLE 2

| 2-Θ | d (Å) | $I/I_0$ (%) |
|---|---|---|
| 7.72 | 11.45 | m |
| 11.69 | 7.56 | w |
| 13.36 | 6.62 | m |
| 13.99 | 6.33 | w |
| 15.42 | 5.74 | w |
| 17.69 | 5.01 | w |
| 19.40 | 4.57 | m |
| 20.46 | 4.34 | m |
| 23.24 | 3.82 | m |
| 23.62 | 3.76 | s |
| 24.72 | 3.60 | m |
| 26.90 | 3.31 | m |
| 28.18 | 3.16 | m |
| 31.32 | 2.85 | vs |
| 33.36 | 2.68 | w |
| 35.82 | 2.50 | w |
| 36.03 | 2.49 | w |
| 40.82 | 2.21 | w |
| 42.58 | 2.12 | w |
| 42.78 | 2.11 | w |
| 47.92 | 1.90 | w |
| 51.30 | 1.78 | w |
| 55.42 | 1.66 | w |

Example 3: SAPO-69 (OFF Topology)

A Teflon bottle was charged with 146.55 g ETMAOH (20.47 wt. %), a stir bar, and 6.07 g TEOS (98%), sealed and allowed to stir 2 days to hydrolyze TEOS. The reaction mixture was transferred to a Teflon beaker equipped with a high speed stirrer. Then 5.79 g pre-ground aluminum isopropoxide (AIP, 13.2 wt. % Al) was added and dissolved with stirring. To the resulting clear solution, 19.57 g $H_3PO_4$ (85.7%) was added dropwise with continued stirring. The resulting clear solution was additionally diluted with 45.00 g de-ionized water. Separately, 1.41 g KOAc (99.4%) was dissolved in 15.13 g de-ionized water and added fast dropwise, the solution was allowed to homogenize further. The resulting clear solution was distributed among 8 Teflon-lined autoclaves which were digested at various temperatures for a variety of time periods at autogenous pressures. The products were isolated by centrifugation, washed with de-ionized water and dried at room temperature. The product isolated from the 175° C. synthesis after 204 hr was identified as SAPO-69 via powder x-ray diffraction. Representative diffraction lines for the 175° C., 183 hr product are shown in Table 3a. A portion of the sample was characterized by hot stage powder X-ray diffraction. The sample was ramped up to 575° C. in a flow of nitrogen, with X-ray patterns taken at various temperatures along the way. The sample was stable at all temperatures, giving the diffraction pattern indicative of SAPO-69. The sample was then exposed to ambient atmosphere at 575° C. and for 4 hr and retained its structure, as indicated in table 3b. Another portion of the sample was calcined at 525° C. and submitted for a BET surface area measurement, giving a surface area of 363 m²/g and a micropore volume of 0.24 cc/g. Scanning Electron Microscopy showed the sample to consist of rounded hexagonal cylinders 200-500 nm in diameter and 300-400 nm tall, each seemingly bundles of smaller crystals. Elemental analysis revealed the material to have the empirical formula $ETMA_{0.61}K_xAl_{2.02}PSi_{2.43}$, the potassium content was not measured in this sample.

TABLE 3

| 2-Θ | d (Å) | I/I₀ (%) |
|---|---|---|
| Table 3a ||| 
| 7.74 | 11.42 | vs |
| 11.68 | 7.57 | m |
| 13.38 | 6.61 | m |
| 14.00 | 6.32 | w |
| 15.48 | 5.72 | m |
| 17.80 | 4.98 | w |
| 19.42 | 4.57 | m |
| 20.48 | 4.33 | m |
| 23.28 | 3.82 | s |
| 23.65 | 3.76 | vs |
| 24.70 | 3.60 | vs |
| 26.94 | 3.31 | m |
| 28.20 | 3.16 | m |
| 31.30 | 2.86 | vs |
| 33.40 | 2.68 | w |
| 35.90 | 2.50 | m |
| 36.10 | 2.49 | m |
| 39.30 | 2.29 | w |
| 40.88 | 2.21 | w |
| 42.62 | 2.12 | w |
| 42.80 | 2.11 | w |
| 43.40 | 2.08 | w |
| 45.59 | 1.99 | w |
| 47.87 | 1.90 | m |
| 49.59 | 1.84 | w |
| 51.30 | 1.78 | w |
| 53.84 | 1.70 | w |
| 55.48 | 1.65 | w |
| Table 3b ||| 
| 7.66 | 11.53 | vs |
| 11.59 | 7.63 | w |
| 13.39 | 6.61 | m |
| 13.93 | 6.35 | w |
| 15.47 | 5.72 | w |
| 19.45 | 4.56 | w |
| 20.55 | 4.32 | w |
| 23.37 | 3.80 | w |
| 23.70 | 3.75 | m |
| 24.64 | 3.61 | m |
| 27.05 | 3.29 | w |
| 28.21 | 3.16 | w |
| 31.32 | 2.85 | m |
| 33.55 | 2.67 | w |
| 35.43 | 2.53 | w |
| 36.02 | 2.49 | w |
| 39.49 | 2.28 | w |
| 42.83 | 2.11 | w |
| 45.81 | 1.98 | w |
| 46.39 | 1.96 | w |
| 47.86 | 1.90 | w |
| 49.88 | 1.83 | w |
| 51.46 | 1.77 | w |
| 55.83 | 1.65 | w |

Example 4: SAPO-69 (OFF Topology)

A Teflon bottle was charged with 150.00 g $HM(OH)_2$ (20 wt. %) and a stir bar. TEOS (98%), 5.42 g, was added, the bottle sealed and the mixture allowed to stir overnight to hydrolyze TEOS. The reaction mixture was transferred to a Teflon beaker equipped with a high speed stirrer. Then 5.21 g pre-ground aluminum isopropoxide (AIP, 13.2 wt. % Al) was added and dissolved with stirring. To the resulting clear solution, 17.43 g $H_3PO_4$ (86.0%) was added dropwise with continued stirring. Separately, 1.25 g KOAc was dissolved in 38.01 g de-ionized water and then added fast dropwise to the reaction mixture. The resulting clear solution was allowed to homogenize further before it was distributed among 6 Teflon-lined autoclaves which were digested at either 150° C. or 175° C. for a variety of time periods at autogenous pressures. The products were isolated by centrifugation, washed with de-ionized water and dried at room temperature. The product isolated from the 175° C. synthesis digested for 289 hr was identified as SAPO-69 via powder x-ray diffraction. Representative diffraction lines for this product are shown in Table 4. Elemental analysis revealed the material to have the empirical formula $HM_{0.22}K_{0.40}Al_{1.62}PSi_{1.63}$.

TABLE 4

| 2-Θ | d (Å) | I/I₀ (%) |
|---|---|---|
| 7.68 | 11.50 | s |
| 11.63 | 7.60 | w |
| 13.34 | 6.63 | m |
| 13.90 | 6.36 | w |
| 15.40 | 5.75 | m |
| 17.68 | 5.01 | w |
| 19.34 | 4.59 | m |
| 20.44 | 4.34 | m |
| 23.20 | 3.83 | s |
| 23.58 | 3.77 | vs |
| 24.16* | 3.68* | w |

TABLE 4-continued

| 2-Θ | d (Å) | I/I₀ (%) |
|---|---|---|
| 24.66 | 3.61 | m |
| 26.86 | 3.32 | m |
| 28.12 | 3.17 | m |
| 30.40 | 2.94 | w |
| 31.24 | 2.86 | vs |
| 33.32 | 2.69 | m |
| 35.82 | 2.51 | m |
| 36.04 | 2.49 | m |
| 40.78 | 2.21 | w |
| 42.56 | 2.12 | w |
| 43.31 | 2.09 | w |
| 45.52 | 2.00 | w |
| 47.86 | 1.90 | w |
| 49.52 | 1.84 | w |
| 51.24 | 1.78 | w |
| 53.64 | 1.71 | w |
| 55.14 | 1.66 | w |
| 55.40 | 1.66 | m |

*Slight SOD Impurity

Example 5: SAPO-69 (OFF Topology)

A Teflon bottle was charged with 884.59 g ETMAOH (20 wt. %) and a stirbar. TEOS (98 wt. %), 35.76 g, was added, the bottle sealed and mixed for 10 minutes on a stirplate. The bottle was transferred to a 100° C. oven for an hour. The resultant clear solution, was removed from the oven and mixed at room temperature for 15 minutes. Then aluminum isopropoxide (98+%), 35.06 g, was added and the mixture was stirred in a sealed bottle for ~2 h, resulting in a clear solution. The mixture was then transferred to a Teflon beaker before 116.46 g of 85% $H_3PO_4$ was slowly added while mixing with an overhead stirrer. Separately, 10.11 g KBr was dissolved in 318.03 g de-ionized water. The KBr solution was then slowly added to the Si/Al/P/ETMAOH solution while continuing to mix with an overhead stirrer, resulting in a clear solution. The solution was transferred to a 2 L autoclave and digested for 7 d at 175° C. under static conditions at autogenous pressure. The obtained solid was collected and washed with de-ionized water by centrifugation and dried at 100° C. The product was identified as SAPO-69 by powder x-ray diffraction; representative diffraction lines for the product are shown in Table 5a. The elemental and CHN analyses showed the product to have the following composition: $ETMA_{0.62}K_{0.57}Al_{2.18}PSi_{2.71}$. A portion of the sample was calcined by placing the material in an oven in contact with a flowing $N_2$ atmosphere, ramping to 450° C. at a rate of 2° C./min and held there for 2 hr. The atmosphere was switched to flowing clean dry air and the sample was held at 450° C. for an additional 5 hr. The sample was found to be stable to calcination when it was analyzed by powder x-ray diffraction and identified as SAPO-69. Representative diffraction lines for the calcined SAPO-69 sample are shown in Table 5b.

TABLE 5

| 2-Θ | d (Å) | I/I₀ (%) |
|---|---|---|
| Table 5a | | |
| 7.74 | 11.41 | vs |
| 11.70 | 7.56 | w |
| 13.39 | 6.61 | m |
| 14.00 | 6.32 | w |
| 15.45 | 5.73 | w |
| 17.80 | 4.98 | w |
| 19.40 | 4.57 | m |
| 20.48 | 4.33 | m |
| 23.25 | 3.82 | m |
| 23.61 | 3.77 | m |
| 24.72 | 3.60 | m |
| 26.89 | 3.31 | w |
| 27.06 | 3.29 | w |
| 28.00 | 3.18 | m |
| 28.19 | 3.16 | m |
| 30.42 | 2.94 | w |
| 31.13 | 2.87 | vs |
| 31.29 | 2.86 | s |
| 33.34 | 2.68 | w |
| 35.45 | 2.53 | w |
| 35.80 | 2.51 | w |
| 36.04 | 2.49 | w |
| 39.16 | 2.30 | w |
| 40.76 | 2.21 | w |
| 42.53 | 2.12 | w |
| 42.80 | 2.11 | w |
| 43.30 | 2.09 | w |
| 45.54 | 1.99 | w |
| 46.10 | 1.97 | w |
| 47.89 | 1.90 | w |
| 48.57 | 1.87 | w |
| 49.52 | 1.84 | w |
| 51.26 | 1.78 | w |
| 53.62 | 1.71 | w |
| 53.80 | 1.70 | w |
| 55.10 | 1.67 | w |
| 55.34 | 1.66 | w |
| Table 5b | | |
| 7.70 | 11.48 | vs |
| 11.74 | 7.54 | w |
| 13.34 | 6.63 | m |
| 14.04 | 6.30 | w |
| 15.42 | 5.74 | w |
| 19.42 | 4.57 | w |
| 20.44 | 4.34 | w |
| 23.22 | 3.83 | w |
| 23.62 | 3.76 | m |
| 24.84 | 3.58 | m |
| 26.88 | 3.31 | w |
| 27.22 | 3.274 | w |
| 27.96 | 3.19 | w |
| 28.30 | 3.15 | w |
| 30.44 | 2.93 | w |
| 31.14 | 2.87 | m |
| 31.40 | 2.85 | m |
| 33.36 | 2.68 | w |
| 35.80 | 2.51 | w |
| 36.04 | 2.49 | w |
| 40.74 | 2.21 | w |
| 42.60 | 2.12 | w |
| 43.06 | 2.10 | w |
| 43.38 | 2.08 | w |
| 45.51 | 1.99 | w |
| 46.22 | 1.96 | w |
| 48.26 | 1.88 | w |
| 49.50 | 1.84 | w |
| 51.44 | 1.77 | w |
| 53.64 | 1.71 | w |
| 55.34 | 1.66 | w |

Example 6: Calcined Exchanged SAPO-69 (OFF Topology)

A portion of the as-synthesized SAPO-69 sample from Example 5 was ammonium ion-exchanged. SAPO-69, 10 g, was slurried in a solution containing 10 g $NH_4NO_3$ dissolved in 100 g de-ionized water. The slurry was heated to 75° C. while mixing in a covered beaker on a temperature controlled hotplate equipped with stirring. The slurry was maintained at 75° C. for 1-4 hr, collected by filtration, and washed with de-ionized water. This procedure was repeated for a total of three exchange steps. The sample was dried at 100° C. overnight after the final exchange. A portion of the sample was ramped to 450° C. in a flowing $N_2$ atmosphere at 2° C./min, held at 450° C. in flowing $N_2$ for 2 hr before the atmosphere was switched to clean, dry air, in which the sample was held for another 5 hr at 450° C. The sample was identified as SAPO-69 by powder x-ray diffraction, exhibiting calcination stability. Representative diffraction lines for the calcined exchanged SAPO-69 sample are shown in Table 6.

TABLE 6

| 2-Θ | d (Å) | I/I$_0$ % |
|---|---|---|
| 7.76 | 11.39 | vs |
| 11.80 | 7.49 | w |
| 13.42 | 6.59 | m |
| 14.14 | 6.26 | w |
| 15.48 | 5.72 | w |
| 19.50 | 4.55 | w |
| 20.54 | 4.32 | w |
| 23.28 | 3.82 | w |
| 23.72 | 3.75 | m |
| 24.96 | 3.56 | m |
| 26.92 | 3.31 | w |
| 27.32 | 3.26 | w |
| 28.02 | 3.18 | w |
| 28.38 | 3.14 | w |
| 30.49 | 2.93 | w |
| 31.18 | 2.87 | m |
| 31.48 | 2.84 | m |
| 33.44 | 2.68 | w |
| 35.84 | 2.50 | w |
| 36.12 | 2.48 | w |
| 40.88 | 2.21 | w |
| 42.70 | 2.12 | w |
| 45.62 | 1.99 | w |
| 46.22 | 1.96 | w |
| 48.40 | 1.88 | w |
| 49.14 | 1.85 | w |
| 49.48 | 1.84 | w |
| 51.58 | 1.77 | w |
| 53.72 | 1.70 | w |
| 55.34 | 1.66 | w |

Example 7: SAPO-79 (ERI Topology)

SAPO-79 is a HCD SAPO with the ERI topology, the first to be stabilized by organoammonium and alkali in the pores. A Teflon bottle was charged with 175.00 g DEDMAOH (20 wt. %), 6.24 g TEOS (98 wt. %) and a stir bar and was mixed briefly. This mixture was then digested in a 95° C. oven for 3.5 hr to hydrolyze the TEOS. The mixture was transferred to a Teflon beaker equipped with a high speed stirrer. Then 6.00 g pre-ground aluminum isopropoxide (13.2% Al) was added and dissolved in the mixture with vigorous stirring. This was followed by the dropwise addition of 20.14 g $H_3PO_4$ (85.7 wt. %) and then the addition of 35.65 g de-ionized water. Separately, 1.44 g KOAc was dissolved in 13.25 g de-ionized water. The resulting solution was added dropwise to the reaction mixture with stirring. Upon completion of the addition, the reaction mixture was homogenized further. The resulting clear solution was distributed among 8 Teflon-lined autoclaves and digested at temperatures of 150° C. and 175° C. for 96, 194, 288 and 382 hr at autogenous pressures. The products were isolated by centrifugation, washed with de-ionized water and dried at room temperature. The products isolated from the 175° C. syntheses after 288 and 382 hr were identified as pure SAPO-79 via powder x-ray diffraction. Representative diffraction lines for the 175° C., 382 hr product are shown in Table 1. Elemental analysis of this product yielded the empirical composition $DEDMA_{0.45}K_{0.35}Al_{1.76}PSi_{1.66}$.

TABLE 7

| 2-Θ | d (Å) | I/I$_0$ % |
|---|---|---|
| 7.70 | 11.47 | vs |
| 9.60 | 9.204 | w |
| 11.69 | 7.56 | w |
| 13.34 | 6.63 | m |
| 14.01 | 6.32 | w |
| 15.42 | 5.74 | m |
| 16.47 | 5.38 | w |
| 17.77 | 4.99 | w |
| 19.38 | 4.58 | s |
| 20.43 | 4.34 | m |
| 21.26 | 4.18 | m |
| 23.20 | 3.83 | m |
| 23.58 | 3.77 | vs |
| 24.74 | 3.60 | s |
| 26.84 | 3.32 | m |
| 27.09 | 3.29 | m |
| 27.9 | 3.19 | m |
| 28.20 | 3.16 | m |
| 30.38 | 2.94 | w |
| 31.10 | 2.87 | s |
| 31.30 | 2.86 | vs |
| 31.643 | 2.83 | m |
| 33.317 | 2.69 | w |
| 35.75 | 2.51 | m |
| 36.02 | 2.49 | m |
| 40.74 | 2.21 | w |
| 42.52 | 2.12 | w |
| 42.84 | 2.11 | w |
| 43.24 | 2.09 | w |
| 47.96 | 1.90 | m |
| 49.44 | 1.84 | w |
| 51.28 | 1.78 | m |
| 55.29 | 1.66 | m |

Example 8: SAPO-79 (ERI Topology)

A Teflon bottle was charged with 1056.44 g DEDMAOH, (20% wt. %), 37.68 g TEOS (98 wt. %) and a magnetic stir bar. The bottle was sealed and mixed overnight on a stir plate. Then, 36.94 g Al-isopropoxide, (98+ wt. %) was added and the mixture was stirred in the sealed bottle for ~2 h, resulting in a clear solution. The reaction mixture was transferred to a Teflon beaker and mixed with a high speed overhead stirrer. Next, 122.72 g $H_3PO_4$ (85%) was slowly added while mixing vigorously. Separately, 10.65 g KBr was dissolved in 235.56 g deionized water. The KBr solution was added slowly in aliquots to the Si/Al/P/DEDMAOH solution while continuing to stir. The resulting clear solution was divided between 2×125 ml and 1×2000 ml autoclaves and digested for 11, 13 and 15 d at 175° C., respectively, at autogenous pressure. The products were isolated by centrifugation, washed with de-ionized water and dried at room temperature. All of the products were identified as SAPO-79 via powder x-ray diffraction. Representative diffraction lines for the 175° C./15 d product are shown in Table 8a below. The elemental analysis of this same product yielded the empirical composition: $DEDMA_{0.49}K_{0.38}Al_{1.69}PSi_{1.71}$. A portion of this sample was calcined by heating to 450° C. under nitrogen at a rate of 2° C./min. The sample was held under nitrogen at that temperature for 3.5 hr. The atmosphere was then switched to clean dry air and the sample was held at 450° C. for an additional 3.5 hr. The sample was then cooled to 100° C. The sample was analyzed immediately by powder x-ray diffraction using a covered holder in an attempt to prevent hydration of the calcined material. The material was stable, identified as calcined SAPO-79 for which the representative diffraction lines are shown in Table 8b. The sample was then opened to the atmosphere and allowed to rehydrate before further analysis with powder x-ray diffraction. The material was again identified as SAPO-79 and was shown to be stable to rehydration. The representative diffraction lines for the rehydrated calcined material are shown in Table 8c.

TABLE 8

| 2-Θ | d (Å) | I/I$_0$% |
|---|---|---|
| Table 8a | | |
| 7.70 | 11.47 | vs |
| 9.61 | 9.20 | w |
| 11.68 | 7.57 | w |
| 13.35 | 6.63 | m |
| 14.00 | 6.32 | w |
| 15.41 | 5.74 | w |
| 16.51 | 5.37 | w |
| 17.76 | 4.99 | w |
| 19.38 | 4.58 | m |
| 20.44 | 4.34 | m |
| 21.26 | 4.18 | w |
| 23.21 | 3.83 | m |
| 23.59 | 3.77 | m |
| 24.73 | 3.60 | m |
| 26.85 | 3.32 | m |
| 27.08 | 3.29 | w |
| 27.96 | 3.19 | w |
| 28.19 | 3.16 | m |
| 30.39 | 2.94 | w |
| 31.10 | 2.87 | m |
| 31.29 | 2.86 | m |
| 31.65 | 2.82 | m |
| 33.32 | 2.69 | w |
| 35.52 | 2.53 | w |
| 35.78 | 2.51 | w |
| 36.00 | 2.49 | w |
| 39.14 | 2.30 | w |
| 39.31 | 2.29 | w |
| 40.75 | 2.21 | w |
| 42.54 | 2.12 | w |
| 42.83 | 2.11 | w |
| 43.28 | 2.09 | w |
| 45.49 | 1.99 | w |
| 47.95 | 1.90 | w |
| 48.65 | 1.87 | w |
| 49.45 | 1.84 | w |
| 51.28 | 1.78 | w |
| Table 8b | | |
| 7.74 | 11.41 | vs |
| 9.70 | 9.11 | w |
| 11.76 | 7.52 | w |
| 13.40 | 6.60 | m |
| 14.08 | 6.29 | w |
| 15.49 | 5.72 | w |
| 16.54 | 5.36 | w |
| 19.46 | 4.56 | w |
| 20.52 | 4.33 | w |
| 21.34 | 4.16 | w |
| 23.28 | 3.82 | w |
| 23.68 | 3.75 | m |
| 24.86 | 3.58 | m |
| 26.94 | 3.31 | w |
| 27.22 | 3.27 | w |
| 28.08 | 3.18 | w |
| 28.32 | 3.15 | w |
| 30.52 | 2.93 | w |
| 31.20 | 2.86 | m |
| 31.44 | 2.84 | m |
| 31.74 | 2.82 | m |
| 33.42 | 2.68 | w |
| 35.90 | 2.50 | w |
| 36.14 | 2.48 | w |
| Table 8c | | |
| 7.76 | 11.39 | vs |
| 9.72 | 9.09 | w |
| 11.78 | 7.51 | m |
| 13.43 | 6.59 | m |
| 14.10 | 6.28 | w |
| 15.50 | 5.71 | w |
| 16.52 | 5.36 | w |
| 19.50 | 4.55 | m |
| 20.54 | 4.32 | m |
| 21.34 | 4.16 | w |
| 23.32 | 3.81 | m |
| 23.72 | 3.75 | m |
| 24.90 | 3.57 | m |
| 26.98 | 3.30 | m |
| 27.20 | 3.28 | w |
| 28.12 | 3.17 | w |
| 28.36 | 3.14 | m |
| 30.54 | 2.92 | w |
| 31.24 | 2.86 | m |
| 31.48 | 2.84 | m |
| 31.80 | 2.81 | m |
| 33.50 | 2.67 | w |
| 35.76 | 2.51 | w |
| 35.92 | 2.50 | w |
| 36.20 | 2.48 | w |

Example 9: Ammonium Ion-Exchanged/Calcined SAPO-79

A portion of the as-synthesized SAPO-79 sample from Example 8 was ammonium ion-exchanged. SAPO-79, 10 g, was slurried in a solution containing 10 g NH$_4$NO$_3$ dissolved in 100 g de-ionized water. The slurry was heated to 75° C. while mixing in a covered beaker on a temperature controlled hotplate equipped with stirring. The slurry was maintained at 75° C. for 1-4 hr, collected by filtration, and washed with de-ionized water. This procedure was repeated for a total of three exchange steps. The sample was dried at 100° C. overnight after the final exchange. A portion of the sample was ramped to 450° C. in a flowing N$_2$ atmosphere at 2° C./min, held at 450° C. in flowing N$_2$ for 2 hr before the atmosphere was switched to clean, dry air, in which the sample was held for another 5 hr at 450° C. The sample was identified as SAPO-79 by powder x-ray diffraction, exhibiting calcination stability. Representative diffraction lines for the calcined exchanged SAPO-79 sample are shown in Table 9a. The sample was then opened to the atmosphere and allowed to rehydrate before further analysis with powder x-ray diffraction. The material was again identified as calcined SAPO-79 and was shown to be stable to calcination and rehydration. The representative diffraction lines for the rehydrated calcined SAPO-79 are shown in Table 9b.

TABLE 9

| 2-Θ | d (Å) | I/I$_0$ (%) |
|---|---|---|
| Table 9a | | |
| 7.72 | 11.45 | vs |
| 9.66 | 9.15 | m |
| 11.76 | 7.52 | w |
| 13.36 | 6.62 | m |
| 14.06 | 6.29 | w |

TABLE 9-continued

| 2-Θ | d (Å) | I/I₀ (%) |
|---|---|---|
| 15.42 | 5.74 | w |
| 16.50 | 5.37 | w |
| 19.42 | 4.57 | w |
| 20.44 | 4.34 | w |
| 21.28 | 4.17 | w |
| 23.22 | 3.83 | w |
| 23.62 | 3.76 | w |
| 24.86 | 3.58 | w |
| 26.86 | 3.32 | w |
| 27.18 | 3.28 | w |
| 27.98 | 3.19 | w |
| 28.32 | 3.15 | w |
| 30.44 | 2.93 | w |
| 31.10 | 2.87 | w |
| 31.42 | 2.85 | m |
| 31.62 | 2.83 | w |
| 33.34 | 2.69 | w |
| 35.76 | 2.51 | w |
| 36.04 | 2.49 | w |
| 40.74 | 2.21 | w |
| 42.54 | 2.12 | w |
| 43.04 | 2.10 | w |
| 43.30 | 2.09 | w |
| 45.52 | 1.99 | w |
| 46.20 | 1.96 | w |
| 48.26 | 1.88 | w |
| 49.48 | 1.84 | w |
| 51.42 | 1.78 | w |
| 55.3 | 1.66 | w |

Table 9b

| 2-Θ | d (Å) | I/I₀ (%) |
|---|---|---|
| 7.76 | 11.39 | vs |
| 9.68 | 9.13 | w |
| 11.77 | 7.51 | m |
| 13.42 | 6.59 | m |
| 14.08 | 6.28 | w |
| 15.50 | 5.71 | w |
| 16.56 | 5.35 | w |
| 19.48 | 4.55 | m |
| 20.54 | 4.32 | m |
| 21.36 | 4.16 | w |
| 23.34 | 3.81 | m |
| 23.72 | 3.75 | m |
| 24.88 | 3.58 | m |
| 26.98 | 3.30 | m |
| 27.22 | 3.27 | w |
| 28.10 | 3.17 | w |
| 28.34 | 3.15 | m |
| 30.54 | 2.92 | w |
| 31.26 | 2.86 | m |
| 31.48 | 2.84 | m |
| 31.82 | 2.81 | m |
| 33.48 | 2.67 | w |
| 35.92 | 2.50 | w |
| 36.20 | 2.48 | w |
| 40.96 | 2.20 | w |
| 42.74 | 2.11 | w |
| 43.50 | 2.08 | w |
| 45.70 | 1.98 | w |
| 46.36 | 1.96 | w |
| 48.28 | 1.88 | w |
| 48.94 | 1.86 | w |
| 49.74 | 1.83 | w |
| 51.56 | 1.77 | w |
| 53.86 | 1.70 | w |
| 55.58 | 1.65 | w |

SPECIFIC EMBODIMENTS

While the following is described in conjunction with specific embodiments, it will be understood that this description is intended to illustrate and not limit the scope of the preceding description and the appended claims.

A first embodiment of the invention is a microporous crystalline silicometallophosphate material having a three-dimensional framework of $[EO_{4/2}]^-$ and $[PO_{4/2}]^+$ and $SiO_{4/2}$ tetrahedral units and an empirical composition in the as synthesized form and anhydrous basis expressed by an empirical formula of $R^{p+}_rM^+_mE_xPSi_yO_z$ where R is at least one of any quaternary ammonium cation, diquaternary ammonium cation triquaternary cation, quatroquaternary cation and mixtures thereof, "r" is the mole ratio of R to P and has a value of about 0.2 to about 3.0, "p" is the weighted average valence of R and varies from 1 to 4, M is an alkali metal such as $Li^+$, $Na^+$, $K^+$, $Rb^+$ and $Cs^+$ and mixtures thereof, "m" is the mole ratio of M to P and varies from 0.2 to 3.0, E is a trivalent element selected from the group consisting of aluminum and gallium and mixtures thereof, "x" is mole ratio of E to P and varies from 1.25 to about 4.0, "y" is the mole ratio of Si to P and varies from 0.25 to about 4.5, "y"≥"x"−1, and "z" is the mole ratio of O to P and has a value determined by the equation $z=(m+p\cdot r+3\cdot x+5+4\cdot y)/2$ and is characterized by a specific x-ray diffraction pattern and the material is thermally stable to at least 450° C. An embodiment of the invention is one, any or all of prior embodiments in this paragraph up through the first embodiment in this paragraph where in the silicoaluminophosphate material E is aluminum. An embodiment of the invention is one, any or all of prior embodiments in this paragraph up through the first embodiment in this paragraph where E is gallium. An embodiment of the invention is one, any or all of prior embodiments in this paragraph up through the first embodiment in this paragraph where R is at least one quaternary ammonium cation selected from the group consisting of tetramethylammonium ($TMA^+$), ethyltrimethylammonium ($ETMA^+$), propyltrimethylammonium ($PTMA^+$), isopropyltrimethylammonium, diethyldimethylammonium ($DEDMA^+$), trimethylbutylammonium ($TMBA^+$), methyltriethylammonium ($MTEA^+$), propylethyldimethylammonium ($PEDMA^+$), N,N-dimethylpiperidinium, N,N-dimethyl-3,5-dimethylpiperidinium, dipropyldimethylammonium ($DPDMA^+$), diethylmethylpropylammonium, trimethylpentylammonium ($TMPA^+$), dimethyldiisopropylammonium, tetraethylammonium (TEA), hexyltrimethylammonium ($HTMA^+$), methylethyldipropylammonium, triethylpropylammonium, dibutyldimethylammonium, benzyltrimethylammonium ($BzTMA^+$), diethyldipropylammonium, octyltrimethylammonium, tetrapropylammonium ($TPA^+$), decyltrimethylammonium, adamantyltrimethylammonium, methyltributylammonium, dodecyltrimethylammonium, hexadecyltrimethylammonium, and tetrabutylammonium ($TBA^+$). An embodiment of the invention is one, any or all of prior embodiments in this paragraph up through the first embodiment in this paragraph where R is at least one diquaternary ammonium cation selected from the group consisting of methylene-bis-(trimethylammonium), bis-1,2-(trimethylammonium) ethylene, bis-1,3(trimethylammonium)propane, bis-1,3-(trimethylammonium)-2-propanol, bis-1,4-(trimethylammonium)butane, bis-1,5-(trimethylammonium)pentane (i.e., pentamethonium), bis-1,6-(trimethylammonium)hexane (i.e., hexamethonium, $HM^{2+}$), bis-1,8-(trimethylammonium)octane, bis-1,10-(trimethylammonium)decane, bis-1,5-(triethylammonium) pentane (i.e., pentaethonium), bis-1,6-(triethylammonium) hexane (i.e., hexaethonium), bis-α,α'-(dimethylethylammonium)-p-xylene, bis-α,α'-(dimethylethylammonium)-m-xylene, bis-α,α'-(dimethylethylammonium)-o-xylene, bis-α,α'-(trimethylammonium)-p-xylene, bis-α,α'-(trimethylammonium)-m-xylene, bis-α,α'-(trimethylammonium)-o-xylene, bis-1,5-(N- methylpiperidinum)pentane, bis-1,6-(N-methylpiperidinum)hexane, N,N,N',N'-tetramethyl-N,N'-p-xyleno-1,6-hexanediammonium, N,N,N',N'-tetramethyl-N,N'-butano-1,6-hexanediammonium, N,N,N',N'-tetrmaethyl-N,N'-hexano-1,6-hexanediammonium, N,N,N',N'-tetraethyl-N,N'-hexano-1,5-pentanediammonium, N,N,N',N'-tetramethyl-N,N'-m-xyleno-1,6-hexanediammonium, N,N,N',N'-tetramethyl-N,N'-o-xyleno-1,2-ethylenediammonium, N,N,N',N'-tetramethyl-N,N'-butano-1,2-ethylenediammonium, and N,N,N',N'-tetramethyl-N,N'-hexano-1,2-ethylenediammonium. An embodiment of the invention is one, any or all of prior embodiments in this paragraph up through the first embodiment in this paragraph where R is at least one triquaternary ammonium cation selected from the group consisting of tris-1,3,5-(triethylammoniomethyl)benzene, tris-1,3,5-(trimethylammoniomethyl)benzene, and tris-1,3,5-(dimethylethylammoniomethyl)benzene. An embodiment of the invention is one, any or all of prior embodiments in this paragraph up through the first embodiment in this paragraph where R is at least one quatroquaternary ammonium cation selected from the group consisting of $[(C_6H_5CH_2)(Me_2)N(-CH_2CH(OH)CH_2N(Me_2)-)_3 CH_2C_6H_5]^{4+}$ (i.e., dibenzylquatroquat), tetrakis-1,2,4,5-(trimethylammoniomethyl)benzene, tetrakis-1,2,4,5-(triethylammoniomethyl)benzene and tetrakis-1,2,4,5-(dimethylethylammoniomethyl)benzene. An embodiment of the invention is one, any or all of prior embodiments in this paragraph up through the first embodiment in this paragraph where "y">"x". An embodiment of the invention is one, any or all of prior embodiments in this paragraph up through the first embodiment in this paragraph where the silicometallophosphate material is thermally stable up to a temperature of at least 500° C. An embodiment of the invention is one, any or all of prior embodiments in this paragraph up through the first embodiment in this paragraph where a stable, calcined form of the crystalline microporous silicometallophosphate is comprising a three-dimensional framework of $[EO_{4/2}]^-$ and $[PO_{4/2}]^+$ and $SiO_{4/2}$ tetrahedral units characterized in that it has the specific x-ray diffraction pattern related to the diffraction pattern of the as-synthesized material.

A second embodiment of the invention is a process for preparing microporous crystalline silicometallophosphate material having a three-dimensional framework of $[EO_{4/2}]^-$ and $[PO_{4/2}]^+$ and $SiO_{4/2}$ tetrahedral units and an empirical composition in the as synthesized form and anhydrous basis expressed by an empirical formula of $R^{p+}_rM_m^+E_xPSi_yO_z$ where R is at least one of any quaternary ammonium cation, diquaternary ammonium cation, triquaternary cation, quatroquaternary cation and mixtures thereof, "r" is the mole ratio of R to P and has a value of about 0.2 to about 3.0, "p" is the weighted average valence of R and varies from 1 to 4, M is an alkali metal such as $Li^+$, $Na^+$, $K^+$, $Rb^+$ and $Cs^+$ and mixtures thereof, "m" is the mole ratio of M to P and varies from 0.2 to 3.0, E is a trivalent element selected from the group consisting of aluminum and gallium and mixtures thereof, "x" is mole ratio of E to P and varies from 1.25 to about 4.0, "y" is the mole ratio of Si to P and varies from 0.25 to about 4.5, "y"≥"x"−1, and "z" is the mole ratio of O to P and has a value determined by the equation z=(m+p·r+3·x+5+4·y)/2 and is characterized by a specific x-ray diffraction pattern and the material is thermally stable to at least 450° C. the process comprising forming a reaction mixture containing reactive sources of R, E, P, M and Si, and heating the reaction mixture at a temperature of about 60° C. to about 200° C. for a time of about 1 day to 28 days to form the silicometallophosphate molecular sieve, the reaction mixture having a composition expressed in terms of mole ratios of the oxides of $aR_{2/p}O$ $bM_2O$ $E_2O_3$ $cP_2O_5$ $dSiO_2$ $eH_2O$ where "a" has a value of about 2.5 to about 20, "b" has a value of about 0.125 to about 1.5, "c" has a value of about 2 to about 8, "d" has a value of about 0.25 to about 8, and "e" has a value from 50 to 1000. An embodiment of the invention is one, any or all of prior embodiments in this paragraph up through the first embodiment in this paragraph where the initial reaction mixture is a clear solution before digestion. An embodiment of the invention is one, any or all of prior embodiments in this paragraph up through the first embodiment in this paragraph where M is selected from the group consisting of $Li^+$, $Na^+$, $K^+$, $Rb^+$ and $Cs^+$ and mixtures thereof. An embodiment of the invention is one, any or all of prior embodiments in this paragraph up through the first embodiment in this paragraph where a source of M is selected from the group consisting of halide salts, nitrate salts, acetate salts, sulfate salts, hydroxide salts and mixtures thereof. An embodiment of the invention is one, any or all of prior embodiments in this paragraph up through the first embodiment in this paragraph where the source of E is selected from the group consisting of aluminum isopropoxide, aluminum sec-butoxide, precipitated alumina, $Al(OH)_3$, alkali aluminate salts, aluminum metal, aluminum halide salts, aluminum sulfate salts, aluminum nitrate salts, precipitated gallium oxyhydroxide, gallium nitrate, gallium sulfate and mixtures thereof. An embodiment of the invention is one, any or all of prior embodiments in this paragraph up through the first embodiment in this paragraph where the silicon source is selected from the group consisting of tetraethylorthosilicate, silicon alkoxides, fumed silica, colloidal silica, alkali silicate salts and precipitated silica. An embodiment of the invention is one, any or all of prior embodiments in this paragraph up through the first embodiment in this paragraph where the reaction mixture is reacted at a temperature of about 125° C. to about 185° C. for a time of about 2 day to about 14 days. An embodiment of the invention is one, any or all of prior embodiments in this paragraph up through the first embodiment in this paragraph where R is at least one quaternary ammonium cation selected from the group consisting of tetramethylammonium ($TMA^+$), ethyltrimethylammonium ($ETMA^+$), propyltrimethylammonium ($PTMA^+$), isopropyltrimethylammonium, diethyldimethylammonium ($DEDMA^+$), trimethylbutylammonium ($TMBA^+$), methyltriethylammonium ($MTEA^+$), propylethyldimethylammonium ($PEDMA^+$), N,N-dimethylpiperidinium, N,N-dimethyl-3,5-dimethylpiperidinium, dipropyldimethylammonium ($DPDMA^+$), diethylmethylpropylammonium, trimethylpentylammonium ($TMPA^+$), dimethyldiisopropylammonium, tetraethylammonium ($TEA^+$), hexyltrimethylammonium ($HTMA^+$), methylethyldipropylammonium, triethylpropylammonium, dibutyldimethylammonium, benzyltrimethylammonium ($BzTMA^+$), diethyldipropylammonium, octyltrimethylammonium, tetrapropylammonium ($TPA^+$), decyltrimethylammonium, adamantyltrimethylammonium, methyltributylammonium, dodecyltrimethylammonium, hexadecyltrimethylammonium, and tetrabutylammonium ($TBA^+$). An embodiment of the invention is one, any or all of prior embodiments in this paragraph up through the first embodiment in this paragraph where R is at least one diquaternary ammonium cation selected from the group consisting of methylene-bis-(trimethylammonium), bis-1,2-(trimethylammonium) ethylene, bis-1,3(trimethylammonium)propane, bis-1,3-(trimethylammonium)-2-propanol, bis-1,4-(trimethylammonium)butane, bis-1,5-(trimethylammonium)pentane (i.e., pentamethonium), bis-1,6-(trimethylammonium)hexane (i.e., hexamethonium, $HM^{2+}$), bis-1,8-(trimethylammonium)octane, bis- 1,10-(trimethylammonium)decane, bis-1,5-(triethylammonium)pentane (i.e., pentaethonium), bis-1,6-(triethylammonium)hexane (i.e., hexaethonium), bis-α,α'-(dimethylethylammonium)-p-xylene, bis-α,α'-(dimethylethylammonium)-m-xylene, bis-α,α'-(dimethylethylammonium)-o-xylene, bis-α,α'-(trimethylammonium)-p-xylene, bis-α,α'-(trimethylammonium)-m-xylene, bis-α,α'-(trimethylammonium)-o-xylene, bis-1,5-(N-methylpiperidinum)pentane, bis-1,6-(N-methylpiperidinum)hexane, N,N,N',N'-tetramethyl-N,N'-p-xyleno-1,6-hexanediammonium, N,N,N',N'-tetramethyl-N,N'-butano-1,6-hexanediammonium, N,N,N',N'-tetrmaethyl-N,N'-hexano-1,6-hexanediammonium, N,N,N',N'-tetraethyl-N,N'-hexano-1,5-pentanediammonium, N,N,N',N'-tetramethyl-N,N'-m-xyleno-1,6-hexanediammonium, N,N,N',N'-tetramethyl-N,N'-o-xyleno-1,2-ethylenediammonium, N,N,N',N'-tetramethyl-N,N'-butano-1,2-ethylenediammonium, and N,N,N',N'-tetramethyl-N,N'-hexano-1,2-ethylenediammonium. An embodiment of the invention is one, any or all of prior embodiments in this paragraph up through the first embodiment in this paragraph where R is at least one triquaternary ammonium cation selected from the group consisting of tris-1,3,5-(triethylammoniomethyl)benzene, tris-1,3,5-(trimethylammoniomethyl)benzene, and tris-1,3,5-(dimethylethylammoniomethyl)benzene. An embodiment of the invention is one, any or all of prior embodiments in this paragraph up through the first embodiment in this paragraph where R is at least one quatroquaternary ammonium cation selected from the group consisting of [($C_6H_5CH_2$)($Me_2$)N(—$CH_2CH(OH)CH_2N(Me_2)$—)$_3$$CH_2C_6H_5$]$^{4+}$ (i.e., dibenzylquatroquat), tetrakis-1,2,4,5-(trimethylammoniomethyl)benzene, tetrakis-1,2,4,5-(triethylammoniomethyl)benzene and tetrakis-1,2,4,5-(dimethylethylammoniomethyl)benzene. An embodiment of the invention is one, any or all of prior embodiments in this paragraph up through the first embodiment in this paragraph further comprising adding seeds of the silicoaluminophosphate to the reaction mixture.

A third embodiment of the invention is a hydrocarbon conversion process comprising contacting a hydrocarbon stream with a catalyst at hydrocarbon conversion conditions to generate at least one converted product, wherein the catalyst is selected from the group consisting of a crystalline microporous HCD silicometallophosphate material, a modified crystalline microporous HCD silicometallophosphate material, a crystalline microporous calcined HCD silicometallophosphate material and mixtures thereof, where the HCD silicometallophosphate is a crystalline microporous silicometallophosphate having a three-dimensional framework of $[EO_{4/2}]^-$ and $[PO_{4/2}]^+$ and $SiO_{4/2}$ tetrahedral units and an empirical composition in the as synthesized form and anhydrous basis expressed by an empirical formula of $R^{p+}{}_rM_m{}^+E_xPSi_yO_z$ where R is at least one of any quaternary ammonium cation, diquaternary ammonium cation triquaternary cation, quatroquaternary cation and mixtures thereof, "r" is the mole ratio of R to P and has a value of about 0.2 to about 3.0, "p" is the weighted average valence of R and varies from 1 to 4, M is an alkali metal selected from the group consisting of $Li^+$, $Na^+$, $K^+$, $Rb^+$ and $Cs^+$ and mixtures thereof, "m" is the mole ratio of M to P and varies from 0.2 to 3.0, E is a trivalent element selected from the group consisting of aluminum and gallium and mixtures thereof, "x" is mole ratio of E to P and varies from 1.25 to about 4.0, "y" is the mole ratio of Si to P and varies from 0.25 to about 4.5, "y"≥"x"−1, and "z" is the mole ratio of O to P and has a value determined by the equation z=(m+p·r+3·x+5+4·y)/2 and is characterized by a specific x-ray diffraction pattern and the material is thermally stable to at least 450° C. and the crystalline microporous modified silicometallophosphate consists of a three-dimensional framework of $[EO_{4/2}]^-$ and $[PO_{4/2}]^+$ and $SiO_{4/2}$ tetrahedral units derived from an as-synthesized silicometallophosphate via the modification processes of calcination, ammonia calcinations, ion-exchange, steaming, various acid extractions, ammonium hexafluorosilicate treatment, or any combination thereof, while the crystalline microporous calcined silicometallophosphate consists of a three-dimensional framework of $[EO_{4/2}]^-$ and $[PO_{4/2}]^+$ and $SiO_{4/2}$ tetrahedral units derived from an as-synthesized or modified silicometallophosphate via calcination and is characterized in that it has a specific x-ray diffraction. An embodiment of the invention is one, any or all of prior embodiments in this paragraph up through the first embodiment in this paragraph wherein the hydrocarbon conversion process is selected from the group consisting of cracking, hydrocracking, alkylation, isomerization, polymerization, reforming, hydrogenation, dehydrogenation, transalkylation, dealkylation, hydration, dehydration, hydrotreating, hydrofining, hydrodenitrogenation, hydrodesulfurization, methanol to olefins, methanation, syngas shift process, olefin dimerization, oligomerization, dewaxing, and combinations thereof. An embodiment of the invention is one, any or all of prior embodiments in this paragraph up through the first embodiment in this paragraph wherein the hydrocarbon conversion process is hydrocracking or hydrotreating and wherein the hydrocracking or hydrotreating is operated at a temperature in the range of about 400° to about 1200° F. (204-649° C.) and a pressure in the range of atmospheric to about 3,500 psig (24,132 kPa g). An embodiment of the invention is one, any or all of prior embodiments in this paragraph up through the first embodiment in this paragraph wherein the hydrocarbon conversion process is catalytic cracking operated at a temperature in the range of about 850° to about 1100° F. (454° to 593° C.), LHSV values of 0.5 to 10 hr$^{-1}$ and a pressure in the range of from about 0 to about 50 psig (0 to 344 kPa g). An embodiment of the invention is one, any or all of prior embodiments in this paragraph up through the first embodiment in this paragraph wherein the hydrocarbon conversion process is alkylation of aromatics and the converted product is at least one linear alkyl substituted aromatic, and wherein the process is operated at an aromatic olefin mole ratio of between 51 and 301, a LHSV of about 0.3 to about 6 hr-1, a temperature of about 100° to about 250° C. and a pressures of about 200 to about 1000 psig (1379 to 6896 kPa). An embodiment of the invention is one, any or all of prior embodiments in this paragraph up through the first embodiment in this paragraph wherein the hydrocarbon conversion process is the conversion of methanol to olefins wherein the process is operated at a temperature of about 300° C. to about 600° C. and a pressure from about 0 kPa (0 psig) to about 1724 kPa (250 psig).

An embodiment of the invention is a separation process comprising contacting at least two components with a material to generate at least one separated component, wherein the catalyst is selected from the group consisting of a crystalline microporous HCD silicometallophosphate material, a modified crystalline microporous HCD silicometallophosphate material, a crystalline microporous calcined HCD silicometallophosphate material and mixtures thereof, where the HCD silicometallophosphate is a crystalline microporous silicometallophosphate having a three-dimensional framework of $[EO_{4/2}]^-$ and $[PO_{4/2}]^+$ and $SiO_{4/2}$ tetrahedral units and an empirical composition in the as synthesized form and anhydrous basis expressed by an empirical formula of $R^{p+}{}_r M_m{}^+ E_x PSi_y O_z$ where R is at least one of any quaternary ammonium cation, diquaternary ammonium cation triquaternary cation, quatroquaternary cation and mixtures thereof, "r" is the mole ratio of R to P and has a value of about 0.2 to about 3.0, "p" is the weighted average valence of R and varies from 1 to 4, M is an alkali metal such as $Li^+$, $Na^+$, $K^+$, $Rb^+$ and $Cs^+$ and mixtures thereof, "m" is the mole ratio of M to P and varies from 0.2 to 3.0, E is a trivalent element selected from the group consisting of aluminum and gallium and mixtures thereof, "x" is mole ratio of E to P and varies from 1.25 to about 4.0, "y" is the mole ratio of Si to P and varies from 0.25 to about 4.5, "y"≥"x"−1, and "z" is the mole ratio of O to P and has a value determined by the equation $z=(m+p \cdot r+3 \cdot x+5+4 \cdot y)/2$ and is characterized by a specific x-ray diffraction pattern and the material is thermally stable to at least 450° C. and the crystalline microporous modified silicometallophosphate consists of a three-dimensional framework of $[EO_{4/2}]^-$ and $[PO_{4/2}]^+$ and $SiO_{4/2}$ tetrahedral units derived from an as-synthesized silicometallophosphate via the modification processes of calcination, ammonia calcinations, ion-exchange, steaming, various acid extractions, ammonium hexafluorosilicate treatment, or any combination thereof, while the crystalline microporous calcined silicometallophosphate consists of a three-dimensional framework of $[EO_{4/2}]^-$ and $[PO_{4/2}]^+$ and $SiO_{4/2}$ tetrahedral units derived from an as-synthesized or modified silicometallophosphate via calcination and is characterized in that it has a specific x-ray diffraction pattern. An embodiment of the invention is one, any or all of prior embodiments in this paragraph up through the first embodiment in this paragraph wherein the separation is based on molecular size of the components, degree of polarity of the components, or ion exchange of the components with the material.

The invention claimed is:

1. A microporous crystalline silicometallophosphate material having a three-dimensional framework of $[EO_{4/2}]^-$ and $[PO_{4/2}]^+$ and $SiO_{4/2}$ tetrahedral units and an empirical composition in the as synthesized form and anhydrous basis expressed by an empirical formula of:

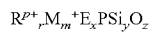

where R is at least one of any quaternary ammonium cation, diquaternary ammonium cation triquaternary cation, quatroquaternary cation and mixtures thereof, "r" is the mole ratio of R to P and has a value of about 0.2 to about 3.0, "p" is the weighted average valence of R and varies from 1 to 4, M is an alkali metal such as $Li^+$, $Na^+$, $K^+$, $Rb^+$ and $Cs^+$ and mixtures thereof, "m" is the mole ratio of M to P and varies from 0.2 to 3.0, E is a trivalent element selected from the group consisting of aluminum and gallium and mixtures thereof, "x" is mole ratio of E to P and varies from 1.25 to about 4.0, "y" is the mole ratio of Si to P and varies from 0.25 to about 4.5, "y"≥"x"−1, and "z" is the mole ratio of 0 to P and has a value determined by the equation:

$$z=(m+p \cdot r+3 \cdot x+5+4 \cdot y)/2$$

and is characterized by a specific x-ray diffraction pattern and the material is thermally stable to at least 450° C.

2. The silicometallophosphate material of claim 1 where R is at least one quaternary ammonium cation selected from the group consisting of tetramethylammonium ($TMA^+$), ethyltrimethylammonium ($ETMA^+$), propyltrimethylammonium ($PTMA^+$), isopropyltrimethylammonium, diethyldimethylammonium ($DEDMA^+$), trimethylbutylammonium ($TMBA^+$), methyltriethylammonium ($MTEA^+$), propylethyldimethylammonium ($PEDMA^+$), N,N-dimethylpiperidinium, N,N-dimethyl-3,5-dimethylpiperidinium, dipropyldimethylammonium ($DPDMA^+$), diethylmethylpropylammonium, trimethylpentylammonium ($TMPA^+$), dimethyldiisopropylammonium, tetraethylammonium ($TEA^+$), hexyltrimethylammonium ($HTMA^+$), methylethyldipropylammonium, triethylpropylammonium, dibutyldimethylammonium, benzyltrimethylammonium ($BzTMA^+$), diethyldipropylammonium, octyltrimethylammonium, tetrapropylammonium ($TPA^+$), decyltrimethylammonium, adamantyltrimethylammonium, methyltributylammonium, dodecyltrimethylammonium, hexadecyltrimethylammonium, and tetrabutylammonium ($TBA^+$).

3. The silicometallophosphate material of claim 1 where R is at least one diquaternary ammonium cation selected from the group consisting of methylene-bis-(trimethylammonium), bis-1,2-(trimethylammonium) ethylene, bis-1,3 (trimethylammonium)propane, bis-1,3-(trimethylammonium)-2-propanol, bis-1,4-(trimethylammonium)butane, bis-1,5-(trimethylammonium)pentane (i.e., pentamethonium), bis-1,6-(trimethylammonium)hexane (i.e., hexamethonium, $HM^{2+}$), bis-1,8-(trimethylammonium)octane, bis-1,10-(trimethylammonium)decane, bis-1,5-(triethylammonium)pentane (i.e., pentaethonium), bis-1,6-(triethylammonium)hexane (i.e., hexaethonium), bis-α,α'-(dimethylethylammonium)-p-xylene, bis-α,α'-(dimethylethylammonium)-m-xylene, bis-α,α'-(dimethylethylammonium)-o-xylene, bis-α,α'-(trimethylammonium)-p-xylene, bis-α,α'-(trimethylammonium)-m-xylene, bis-α,α'-(trimethylammonium)-o-xylene, bis-1,5-(N-methylpiperidinum)pentane, bis-1,6-(N-methylpiperidinum)hexane, N,N,N',N'-tetramethyl-N,N'-p-xyleno-1,6-hexanediammonium, N,N,N',N'-tetramethyl-N,N'-butano-1,6-hexanediammonium, N,N,N',N'-tetrmaethyl-N,N'-hexano-1,6-hexanediammonium, N,N,N',N'-tetraethyl-N,N'-hexano-1,5-pentanediammonium, N,N,N',N'-tetramethyl-N,N'-m-xyleno-1,6-hexanediammonium, N,N,N',N'-tetramethyl-N,N'-o-xyleno-1,2-ethylenediammonium, N,N,N',N'-tetramethyl-N,N'-butano-1,2-ethylenediammonium, and N,N,N',N'-tetramethyl-N,N'-hexano-1,2-ethylenediammonium; where R is at least one triquaternary ammonium cation selected from the group consisting of tris-1,3,5-(triethylammoniomethyl)benzene, tris-1,3,5-(trimethylammoniomethyl)benzene, and tris-1,3,5-(dimethylethylammoniomethyl)benzene or where R is at least one quatroquaternary ammonium cation selected from the group consisting of $[(C_6H_5CH_2)(Me_2)N(—CH_2CH(OH)CH_2N(Me_2)—)_3CH_2C_6H_5]^{4+}$ (i.e., dibenzylquatroquat), tetrakis-1,2,4,5-(trimethylammoniomethyl)benzene, tetrakis-1,2,4,5-(triethylammoniomethyl)benzene and tetrakis-1,2,4,5-(dimethylethylammoniomethyl)benzene.

4. The silicometallophosphate material of claim 1 in where "y">"x".

5. The silicometallophosphate material of claim 1 where the silicometallophosphate material is thermally stable up to a temperature of at least 500° C.

6. A stable, calcined form of the crystalline microporous silicometallophosphate of claim 1, comprising a three-dimensional framework of $[EO_{4/2}]^+$ and $[PO_{4/2}]^+$ and $SiO_{4/2}$ tetrahedral units characterized in that it has the specific x-ray diffraction pattern related to the diffraction pattern of the as-synthesized material.

7. A process for preparing microporous crystalline silicometallophosphate material having a three-dimensional framework of $[EO_{4/2}]^+$ and $[PO_{4/2}]^+$ and $SiO_{4/2}$ tetrahedral units and an empirical composition in the as synthesized form and anhydrous basis expressed by an empirical formula of:

$$R^{p+}_r M^+_m E_x PSi_y O_z$$

where R is at least one of any quaternary ammonium cation, diquaternary ammonium cation, triquaternary cation, quatroquaternary cation and mixtures thereof, "r" is the mole ratio of R to P and has a value of about 0.2 to about 3.0, "p" is the weighted average valence of R and varies from 1 to 4, M is an alkali metal such as $Li^+$, $Na^+$, $K^+$, $Rb^+$ and $Cs^+$ and mixtures thereof, "m" is the mole ratio of M to P and varies from 0.2 to 3.0, E is a trivalent element selected from the group consisting of aluminum and gallium and mixtures thereof, "x" is mole ratio of E to P and varies from 1.25 to about 4.0, "y" is the mole ratio of Si to P and varies from 0.25 to about 4.5, "y"≥"x"−1, and "z" is the mole ratio of O to P and has a value determined by the equation:

$$z = (m + p \cdot r + 3 \cdot x + 5 + 4 \cdot y)/2$$

and is characterized by a specific x-ray diffraction pattern and the material is thermally stable to at least 450° C. the process comprising forming a reaction mixture containing reactive sources of R, E, P, M and Si, and heating the reaction mixture at a temperature of about 60° C. to about 200° C. for a time of about 1 day to 28 days to form the silicometallophosphate molecular sieve, the reaction mixture having a composition expressed in terms of mole ratios of the oxides of:

$$aR_{2/p}O : bM_2O : E_2O_3 : cP_2O_5 : dSiO_2 : eH_2O$$

where "a" has a value of about 2.5 to about 20, "b" has a value of about 0.125 to about 1.5, "c" has a value of about 2 to about 8, "d" has a value of about 0.25 to about 8, and "e" has a value from 50 to 1000.

8. The process of claim 7 where the initial reaction mixture is a clear solution before digestion.

9. The process of claim 7 where a source of M is selected from the group consisting of halide salts, nitrate salts, acetate salts, sulfate salts, hydroxide salts and mixtures thereof.

10. The process of claim 7 where the source of E is selected from the group consisting of aluminum isopropoxide, aluminum sec-butoxide, precipitated alumina, $Al(OH)_3$, alkali aluminate salts, aluminum metal, aluminum halide salts, aluminum sulfate salts, aluminum nitrate salts, precipitated gallium oxyhydroxide, gallium nitrate, gallium sulfate and mixtures thereof.

11. The process of claim 7 where the silicon source is selected from the group consisting of tetraethylorthosilicate, silicon alkoxides, fumed silica, colloidal silica, alkali silicate salts and precipitated silica.

12. The process of claim 7 where the reaction mixture is reacted at a temperature of about 125° C. to about 185° C. for a time of about 2 day to about 14 days.

13. The process of claim 7 where R is at least one quaternary ammonium cation selected from the group consisting of tetramethylammonium ($TMA^+$), ethyltrimethylammonium ($ETMA^+$), propyltrimethylammonium ($PTMA^+$), isopropyltrimethylammonium, diethyldimethylammonium ($DEDMA^+$), trimethylbutylammonium ($TMBA^+$), methyltriethylammonium ($MTEA^+$), propylethyldimethylammonium ($PEDMA^+$), N,N-dimethylpiperidinium, N,N-dimethyl-3,5-dimethylpiperidinium, dipropyldimethylammonium ($DPDMA^+$), diethylmethylpropylammonium, trimethylpentylammonium ($TMPA^+$), dimethyldiisopropylammonium, tetraethylammonium ($TEA^+$), hexyltrimethylammonium ($HTMA^+$), methylethyldipropylammonium, triethylpropylammonium, dibutyldimethylammonium, benzyltrimethylammonium ($BzTMA^+$), diethyldipropylammonium, octyltrimethylammonium, tetrapropylammonium ($TPA^+$), decyltrimethylammonium, adamantyltrimethylammonium, methyltributylammonium, dodecyltrimethylammonium, hexadecyltrimethylammonium, and tetrabutylammonium ($TBA^+$).

14. The process of claim 7 where R is at least one diquaternary ammonium cation selected from the group consisting of methylene-bis-(trimethylammonium), bis-1,2-(trimethylammonium) ethylene, bis-1,3(trimethylammonium)propane, bis-1,3-(trimethylammonium)-2-propanol, bis-1,4-(trimethylammonium)butane, bis-1,5-(trimethylammonium)pentane (i.e., pentamethonium), bis-1,6-(trimethylammonium)hexane (i.e., hexamethonium, $HM^{2+}$), bis-1,8-(trimethylammonium)octane, bis-1,10-(trimethylammonium)decane, bis-1,5-(triethylammonium) pentane (i.e., pentaethonium), bis-1,6-(triethylammonium) hexane (i.e., hexaethonium), bis-α,α'-(dimethylethylammonium)-p-xylene, bis-α,α'-(dimethylethylammonium)-m-xylene, bis-α,α'-(dimethylethylammonium)-o-xylene, bis-α,α'-(trimethylammonium)-p-xylene, bis-α,α'-(trimethylammonium)-m-xylene, bis-α,α'-(trimethylammonium)-o-xylene, bis-1,5-(N-methylpiperidinum)pentane, bis-1,6-(N-methylpiperidinum)hexane, N,N,N',N'-tetramethyl-N,N'-p-xyleno-1,6-hexanediammonium, N,N,N',N'-tetramethyl-N,N'-butano-1,6-hexanediammonium, N,N,N',N'-tetrmaethyl-N,N'-hexano-1,6-hexanediammonium, N,N,N',N'-tetraethyl-N,N'-hexano-1,5-pentanediammonium, N,N,N',N'-tetramethyl-N,N'-m-xyleno-1,6-hexanediammonium, N,N,N',N'-tetramethyl-N,N'-o-xyleno-1,2-ethylenediammonium, N,N,N',N'-tetramethyl-N,N'-butano-1,2-ethylenediammonium, and N,N,N',N'-tetramethyl-N,N'-hexano-1,2-ethylenediammonium.

15. The process of claim 7 where R is at least one triquaternary ammonium cation selected from the group consisting of tris-1,3,5-(triethylammoniomethyl)benzene, tris-1,3,5-(trimethylammoniomethyl)benzene, and tris-1,3,5-(dimethylethylammoniomethyl)benzene.

16. The process of claim 7 where R is at least one quatroquaternary ammonium cation selected from the group consisting of $[(C_6H_5CH_2)(Me_2)N(-CH_2CH(OH)CH_2N(Me_2)-)_3CH_2C_6H_5]^{4+}$ (i.e., dibenzylquatroquat), tetrakis-1,2,4,5-(trimethylammoniomethyl)benzene, tetrakis-1,2,4,5-(triethylammoniomethyl)benzene and tetrakis-1,2,4,5-(dimethylethylammoniomethyl)benzene.

17. The process of claim 7 further comprising adding seeds of the silicoaluminophosphate to the reaction mixture.

* * * * *